US012570501B2

(12) United States Patent
Evert et al.

(10) Patent No.: US 12,570,501 B2
(45) Date of Patent: Mar. 10, 2026

(54) CONDITION MONITORING SYSTEM FOR ELEVATOR HOISTING MEMBERS

(71) Applicant: TK Elevator Innovation and Operations GmbH, Düsseldorf (DE)

(72) Inventors: Andrew J. Evert, Smyrna, GA (US); Christopher Taylor, Byhalia, MS (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 1051 days.

(21) Appl. No.: 17/681,294

(22) Filed: Feb. 25, 2022

(65) Prior Publication Data

US 2023/0271808 A1 Aug. 31, 2023

(51) Int. Cl.

| | |
|---|---|
| ***B66B 5/00*** | (2006.01) |
| ***B66B 5/14*** | (2006.01) |
| ***B66B 5/16*** | (2006.01) |
| ***B66B 7/12*** | (2006.01) |

(52) U.S. Cl.

CPC .............. *B66B 5/0031* (2013.01); *B66B 5/14* (2013.01); *B66B 5/16* (2013.01); *B66B 7/1215* (2013.01); *B66B 7/1223* (2013.01)

(58) Field of Classification Search

CPC ........... B66B 5/0031; B66B 5/14; B66B 5/16; B66B 7/1215

See application file for complete search history.

(56) References Cited

U.S. PATENT DOCUMENTS

| | | | | |
|---|---|---|---|---|
| 5,400,204 | A * | 3/1995 | Oshima | B66B 7/064 361/48 |
| 6,653,943 | B2 | 11/2003 | Lamb et al. | |
| 7,117,981 | B2 | 10/2006 | Logan et al. | |
| 7,192,185 | B2 | 3/2007 | Lustenberger | |
| 7,409,870 | B2 | 8/2008 | Stucky et al. | |
| 7,410,033 | B2 | 8/2008 | Veronesi et al. | |
| 7,506,728 | B2 | 3/2009 | Hawkes et al. | |
| 7,540,359 | B2 | 6/2009 | Veronesi et al. | |

(Continued)

FOREIGN PATENT DOCUMENTS

| | | | | |
|---|---|---|---|---|
| FI | 124542 B | * 10/2014 | | B66B 7/062 |
| WO | 2019063866 A1 | 4/2019 | | |

(Continued)

*Primary Examiner* — Bickey Dhakal

(74) *Attorney, Agent, or Firm* — Dinsmore & Shohl LLP

(57) ABSTRACT

Embodiments of the present disclosure are directed to a system for monitoring conditions of elevator hoisting members. The system includes a processing device configured to receive an actual resistance data from the one or more pairs of tensile load bearing conductive members, calculate an adjusted resistance data by subtracting the actual resistance data from a baseline resistance data and dividing by the baseline resistance data, input the adjusted resistance data into a process configured to model the adjusted resistance data into a breaking strength value for the elevator hoisting member, receive the breaking strength value, and determine whether the breaking strength value is below a predetermined threshold value for a rated breaking load of the elevator hoisting member, wherein when the breaking strength value is below the predetermined threshold value, output an alert to the elevator controller to instruct the elevator controller to inhibit movement of the elevator hoisting member.

20 Claims, 8 Drawing Sheets

(56) References Cited

U.S. PATENT DOCUMENTS

| | | | | |
|---|---|---|---|---|
| 7,686,140 | B2 | 3/2010 | Rossignol et al. | |
| 7,801,690 | B2 | 9/2010 | Veronesi et al. | |
| 7,819,690 | B2 | 10/2010 | Faulkner et al. | |
| 7,938,233 | B2 | 5/2011 | Kunz | |
| 7,982,458 | B2 | 7/2011 | Yoshioka et al. | |
| 8,011,479 | B2 | 9/2011 | Stucky et al. | |
| 8,312,987 | B2 | 11/2012 | Lynn et al. | |
| 8,424,653 | B2 | 4/2013 | Stucky et al. | |
| 8,640,828 | B2 | 2/2014 | Annen et al. | |
| 8,686,747 | B2 | 4/2014 | Berner et al. | |
| 8,807,286 | B2 | 8/2014 | Puranen et al. | |
| 8,813,918 | B2 | 8/2014 | Kocher et al. | |
| 8,851,239 | B2 | 10/2014 | Nakamori | |
| 8,991,562 | B2 | 3/2015 | Odermatt et al. | |
| 9,063,008 | B2 | 6/2015 | Husmann et al. | |
| 9,063,009 | B2 | 6/2015 | Husmann et al. | |
| 9,254,985 | B2 | 2/2016 | Nolting et al. | |
| 9,385,447 | B2 | 7/2016 | Dold et al. | |
| 9,423,369 | B2 | 8/2016 | Fargo et al. | |
| 9,599,582 | B2 | 3/2017 | Fargo et al. | |
| 9,618,409 | B2 | 4/2017 | Garfinkel et al. | |
| 9,643,816 | B2 | 5/2017 | Bachmann et al. | |
| 9,650,227 | B2 | 5/2017 | Kalliomaki | |
| 9,731,939 | B2 | 8/2017 | Sun et al. | |
| 9,796,561 | B2 | 10/2017 | Guilani et al. | |
| 9,828,216 | B2 | 11/2017 | Berben et al. | |
| 9,862,571 | B2 | 1/2018 | Sun et al. | |
| 9,862,572 | B2 | 1/2018 | Fargo | |
| 9,927,384 | B2 | 3/2018 | Lehtinen et al. | |
| 9,932,203 | B2 * | 4/2018 | Robibero | B66B 7/062 |
| 9,995,711 | B2 | 6/2018 | Garfinkel et al. | |
| 10,023,433 | B2 | 7/2018 | Dold et al. | |
| 10,029,888 | B2 | 7/2018 | Lehtinen et al. | |
| 10,202,258 | B2 | 2/2019 | Dold et al. | |
| 10,329,119 | B2 | 6/2019 | Puranen et al. | |
| 10,336,580 | B2 | 7/2019 | Cereghetti et al. | |
| 10,399,821 | B2 | 9/2019 | Roberts | |
| 2013/0153340 | A1 * | 6/2013 | Dold | B66B 7/1223 187/393 |
| 2016/0229667 | A1 * | 8/2016 | Cereghetti | B66B 7/1223 |
| 2017/0057788 | A1 | 3/2017 | Helenius | |
| 2018/0134520 | A1 | 5/2018 | Mikkonen et al. | |
| 2018/0215584 | A1 | 8/2018 | Henneau | |
| 2018/0215585 | A1 | 8/2018 | Robibero et al. | |
| 2018/0229970 | A1 | 8/2018 | Lehtinen et al. | |
| 2018/0306752 | A1 | 10/2018 | Puranen et al. | |
| 2019/0047822 | A1 | 2/2019 | Dold et al. | |
| 2019/0047823 | A1 | 2/2019 | Robibero et al. | |
| 2019/0071282 | A1 | 3/2019 | Zapf | |
| 2019/0119071 | A1 * | 4/2019 | Dudde | B66B 7/085 |
| 2019/0168999 | A1 | 6/2019 | Guilani | |
| 2019/0256324 | A1 | 8/2019 | Antin | |
| 2019/0322487 | A1 | 10/2019 | Valjus | |
| 2019/0337761 | A1 | 11/2019 | Robibero et al. | |
| 2019/0345004 | A1 | 11/2019 | Henneau | |
| 2019/0352131 | A1 | 11/2019 | Dold et al. | |

FOREIGN PATENT DOCUMENTS

| | | | |
|---|---|---|---|
| WO | 2019063873 | A1 | 4/2019 |
| WO | 2019066856 | A1 | 4/2019 |

* cited by examiner

CONDITION MONITORING SYSTEM FOR ELEVATOR HOISTING MEMBERS

TECHNICAL FIELD

The present disclosure generally relates to elevator hoisting members and, more particularly, to systems and methods for monitoring the conditions of elevator hoisting members.

BACKGROUND

Current traction elevators now often use one or more relatively thin traction belts as the hoisting/suspension member(s). These traction belts are typically made of a plurality of thin or small diameter tension members, such as steel cords, that are laid parallel to each other, spaced apart side-by-side in a single row, and are fully embedded along their length within a polymer outer jacket. Because the tension members of the elevator hoisting member are fully embedded/encapsulated within the polymer outer jacket, except at the terminal ends of the belt, they cannot be visually inspected along their length for signs of wear. In the case where the embedded tension members are steel cords, those signs of wear can include abrasion of individual wires that make up the cord, corrosion, fatigue cracking, and other potentially serious issues that could affect their structural integrity as tension/suspension members and lead to failure of the elevator hoisting belt.

For belts that incorporate cords made of electrically conductive materials, such as steel cords made from a plurality of individual steel wires twisted together in various configurations, it is now fairly common to use electrical signals sent from one terminal end of the cords to the opposite terminal end of the cords to monitor the conditions of one or more of the individual cords. The conditions monitored via electrical signals can include, among other characteristics, the residual tensile strength remaining in the cords, the degree of corrosion present in each cord, identification of individual broken cords, and/or the like. However, this monitoring requires a maintenance technician being present and manually initiating the test and determining the results. Moreover, as with any human intervention, there is a possibility to have errors in reading and/or performing the different tests. Further, the monitoring is not a probabilistic monitoring and instead is generally a one-time gathering of data. Accordingly, a need exists to passively monitor the elevator hoisting belt using probabilistic techniques and inhibiting a movement of the belt when the conditions of the cords embedded within the belt meet or exceed predetermined thresholds based on a determined residual tensile strength remaining in the belt, the degree of corrosion present in each cord, identification of individual broken cords, and/or the like.

SUMMARY

In one embodiment, a system for monitoring operating conditions of an elevator hoisting member having one or more pairs of tensile load bearing conductive members is provided. The system includes an elevator controller, a processing device and a non-transitory, processor-readable storage medium. The processing device is commutatively coupled to the elevator controller. The non-transitory, processor-readable storage medium is in communication with the processing device. The non-transitory, processor-readable storage medium comprising one or more programming instructions that, when executed, cause the processing device to receive an actual resistance data from the one or more pairs of tensile load bearing conductive members, calculate an adjusted resistance data by subtracting the actual resistance data from a baseline resistance data of the one or more pairs of tensile load bearing conductive members and dividing by the baseline resistance data, input the adjusted resistance data into a process configured to model the adjusted resistance data into a breaking strength value for the elevator hoisting member, receive the breaking strength value, and determine whether the breaking strength value is below a predetermined threshold value for a rated breaking load of the elevator hoisting member. When the breaking strength value is below the predetermined threshold value, output an alert to the elevator controller to instruct the elevator controller to inhibit movement of the elevator hoisting member.

In another embodiment, a method for monitoring operating conditions of an elevator hoisting member having one or more pairs of tensile load bearing conductive members is provided. Each one of the one or more pairs of tensile load bearing conductive members receiving and transmitting electrical signals indicative of the operating condition of the elevator hoisting member. The method includes initiating, by an condition monitoring controller that is communicatively coupled to the one of the one or more pairs of tensile load bearing conductive members, a measurement command to gather a current sample of a continuous electrical signal that travels within the one of the one or more pairs of tensile load bearing conductive members of the elevator hoisting member, receiving, by the condition monitoring controller, an actual resistance data from the one or more pairs of tensile load bearing conductive members, calculating, by the condition monitoring controller, an adjusted resistance data by subtracting the actual resistance data from a baseline resistance data of the one or more pairs of tensile load bearing conductive members and dividing by the baseline resistance data, and inputting, by the condition monitoring controller, the adjusted resistance data into a process configured to model the adjusted resistance data into a breaking strength for the elevator hoisting member. The method continues by receiving, by the condition monitoring controller, the breaking strength value for the elevator hoisting member and determining whether the breaking strength value for the elevator hoisting member is below a predetermined threshold value for a rated breaking load for the elevator hoisting member and outputting, by the condition monitoring controller, an alert to an elevator controller to instruct the elevator controller to inhibit movement of the elevator hoisting member when the breaking strength value for the elevator hoisting member is below the predetermined threshold value.

In yet another embodiment, a system for monitoring operating conditions of an elevator hoisting member having one or more pairs of tensile load bearing conductive members of an elevator assembly is provided. The elevator assembly further includes an elevator controller, an elevator cab and at least one sheave. The elevator hoisting member has a sleeve enclosing the one or more pairs of tensile load bearing conductive members. The elevator hoisting member extends around the at least one sheave to support the elevator cab. The system includes a processing device and a storage medium. The processing device is communicatively coupled to the elevator controller. The storage medium is in communication with the processing device and has one or more programming instructions that, when executed, cause the processing device to initiate a measurement command to gather an actual resistance data of the one or more pairs of tensile load bearing conductive members, receive the actual resistance data from the one of the one or more pairs of tensile load bearing conductive members, calculate an adjusted resistance data by subtracting the current resistance data from a baseline resistance data of the one or more pairs of tensile load bearing conductive members and dividing by the baseline resistance data, input the adjusted resistance data into a process configured to model the adjusted resistance data into a breaking strength value for the elevator hoisting member, receive the breaking strength value for the elevator hoisting member, formulate an estimated breaking strength value summation for the elevator hoisting member by averaging the breaking strength value for the elevator hoisting member with the predetermined number of historical breaking strength values for the elevator hoisting member, and determine whether the estimated breaking strength value summation for the elevator hoisting member is below a predetermined threshold value for a rated breaking load for the elevator hoisting member. When the estimated breaking strength value summation for the elevator hoisting member is below the predetermined threshold value, output an alert to the elevator controller to inhibit movement of the elevator hoisting member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1A:
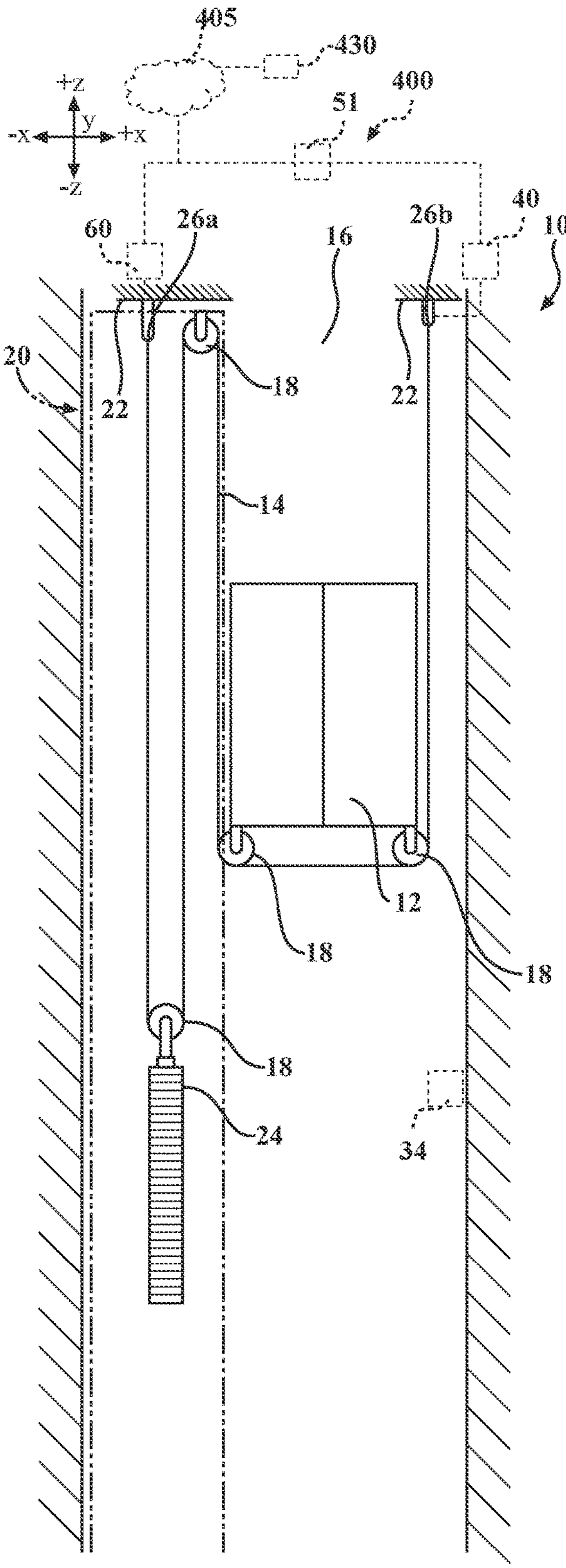
FIG. 1A schematically depicts a first aspect of an example elevator assembly schematic, according to one or more embodiments shown and described herein.

Embodiments of the present disclosure are directed to improved systems and methods to monitor and identify when an elevator hoisting member needs to be replaced based on degradation of condition. More specifically, the disclosed systems and methods provide an approach to monitor actual conditions of the elevator hoisting member for undesirable conditions or events, such as broken or frayed tensile members, corrosion of one or more pairs of tensile load bearing conductive members, excessive fatigue or bend, and/or the like, which affect the operating condition of the elevator hoisting member. Such undesirable conditions may generate open and/or short circuit events (e.g., short circuit to ground events), and/or change or affect a breaking strength of one or more pairs of tensile load bearing conductive members positioned within an outer jacket of the elevator hoisting member. Embodiments herein monitor for such changes using machine learning processes to remotely determine when a deviation occurs signaling a change in the condition of the elevator hoisting members.

Specifically, an electrical resistance value of one or more pairs of tensile load bearing conductive members of the elevator hoisting member is gathered and compared to a baseline resistance level for that particular elevator hoisting member. The electrical resistance value may be adjusted to account for drift of measured resistance values of the elevator hoisting member and the baseline is then subtracted from the adjusted electrical resistance value to calculate a difference between the baseline value and the adjusted electrical resistance value. The adjusted electrical resistance value is divided by the baseline value to formulate a drift-adjusted value for each pair of conductive members within the elevator hoisting member. Each drift-adjusted value may be an input into a machine learning process that precisely and continuously classifies each drift-adjusted value to output a breaking strength value. For example, each drift-adjusted value may be subjected through a plurality of decision trees with a predetermined depth such that a model is generated that predicts the breaking strength value for the elevator hoisting member. The model may be used for estimating the elevator hoisting member breaking strength, which is then assessed for any deviations. The model estimates the actual breaking strength of the elevator hoisting member and comparatively determines, based on a rated breaking load for that particular elevator hoisting member, the percentage that the actual breaking strength value is from the rated breaking load.

As such, the various components described herein may be used to carry out one or more processes to improve accuracy of determining undesirable conditions of the elevator hoisting member using machine learning process to passively improve the accuracy of condition monitoring the elevator hoisting member as opposed to conventional electrical resistance readings. Further, various components described herein may be used to alert a user when certain predetermined parameters are below threshold values such as for a breaking strength or command an elevator controller to automatically and passively inhibit movement of the elevator hoisting member.

Various systems and methods for monitoring elevator hoisting members are described in detail herein.

The phrase "communicatively coupled" is used herein to describe the interconnectivity of various components of the monitoring system for elevator assemblies and means that the components are connected either through wires, optical fibers, or wirelessly such that electrical, optical, data, and/or electromagnetic signals may be exchanged between the components. It should be understood that other means of connecting the various components of the system not specifically described herein are included without departing from the scope of the present disclosure.

Referring now to the drawings, FIG. 1A depicts an elevator assembly schematic that illustrates various components for a first aspect of an example elevator assembly 10. In this aspect, the example elevator assembly 10 may include an elevator cab 12, a plurality of elevator hoisting members 14 illustrated for schematic reasons as a single suspension member and herein referred to as hoisting members, a hoistway 16 or elevator shaft, a plurality of sheaves 18, an example frame 20, and a plurality of weights 24 that act as a counterweight to the elevator cab 12. The plurality of weights 24 move within the example frame 20 in the system vertical direction (i.e., in the +/−Z direction). The example frame 20 may be an elevator frame, a counterweight elevator frame, and/or the like, as discussed in greater detail herein. The plurality of elevator hoisting members 14 include a distal end 26*a* and a proximate end 26*b*.

Further, in this aspect, as illustrated and without limitation, the example frame 20 includes two sheaves of the plurality of sheaves 18. For example, one sheave is fixedly mounted to an upper portion of the example frame 20 positioned in an upper portion of the hoistway 16 above the elevator cab 12 in a vertical direction (i.e., in the +/−Z direction) and another sheave moves with the weights 24 as the elevator cab 12 moves between various landings. This is non-limiting, and any number of the plurality of sheaves 18 may be mounted anywhere within the hoistway 16 and there may be more than or less than the two sheaves illustrated as being in the example frame 20.

At least one of the plurality of sheaves 18 within the hoistway 16 may include a motor such that the sheave is a traction sheave capable of driving the plurality of elevator hoisting members 14 through a plurality of lengths between the elevator cab 12 and the traction sheave. Further, the plurality of sheaves 18 may further include a plurality of idler sheaves that may also be mounted at various positions in the hoistway 16, and, in this aspect, are also coupled to the elevator cab 12. Idler sheaves are passive (they do not drive the elevator hoisting members 14, but rather guide or route the plurality of elevator hoisting members 14) and form a contact point, or engagement point, with the elevator cab 12. The plurality of elevator hoisting members 14 and the plurality of sheaves 18 move the elevator cab 12 between a plurality of positions within the hoistway 16 including to a plurality of landings. The plurality of sheaves 18 may include any combination of traction type sheaves and idler type sheaves. At least one temperature sensor 34 may be positioned within the hoistway 16. The at least one temperature sensor 34 may output data indicative to a temperature within the hoistway 16.

As illustrated in FIG. 1A, the elevator assembly 10 is an underslung system, with the idler sheaves positioned on a bottom surface of the elevator cab 12. Each of the plurality of elevator hoisting members 14 may be movably coupled to the traction sheave and a portion of the plurality of elevator hoisting members 14 may be coupled to the bottom surface of the elevator cab 12 to suspend the elevator cab 12 via the idler sheaves. As such, the elevator hoisting members 14 pass under the elevator cab 12 on a bottom of the elevator cab 12 via the idler sheaves, and are coupled at the top of the hoistway 16 under tension to various structures, such as to the example frame 20, a plurality of rail caps 22, and/or the like. For example, the proximate end 26*b* of the plurality of elevator hoisting members 14 may be fixedly coupled to the rail caps 22 and the movably coupled portion of the plurality of elevator hoisting members 14 are under tension to move the elevator cab 12 between various landings. The example frame 20 may include a dead end hitch, at least one of the plurality of rail caps 22, or other structural components.

Figure 1B:
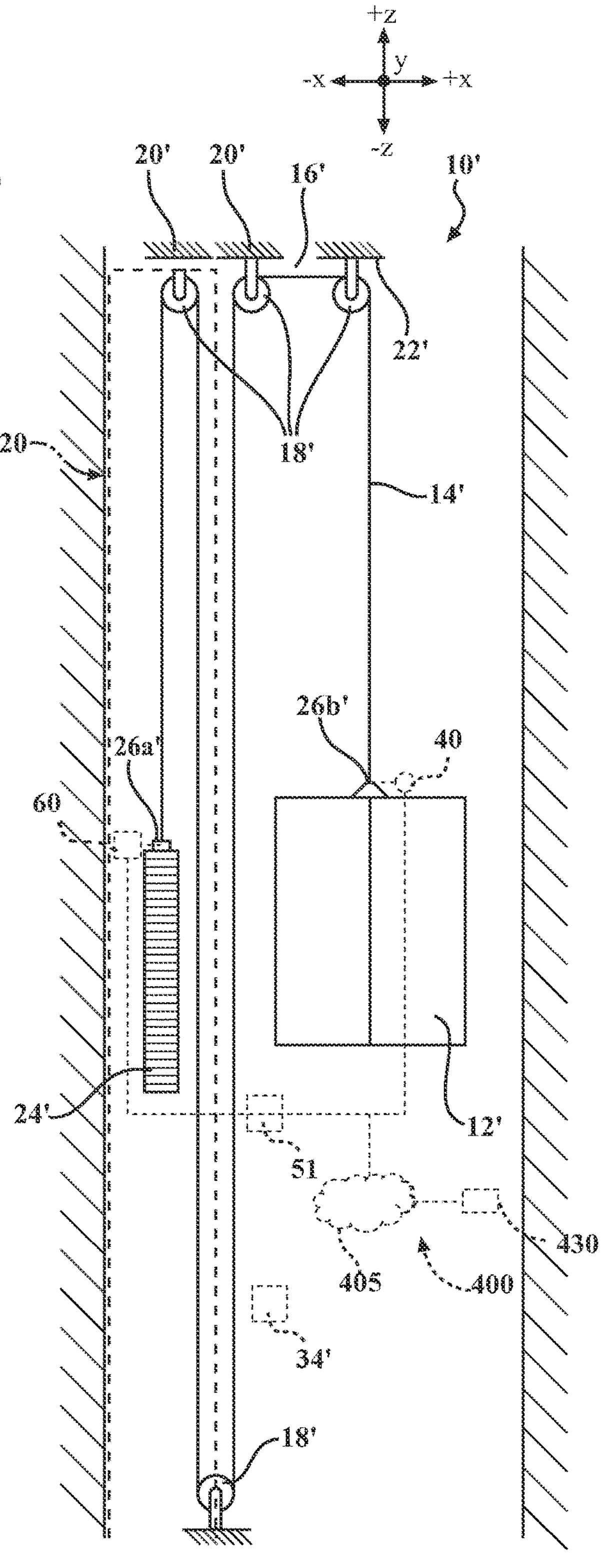
FIG. 1B schematically depicts a second aspect of an example elevator assembly schematic, according to one or more embodiments shown and described herein.

Referring now to FIG. 1B, a schematic illustrating various components for a second aspect of an example elevator assembly 10' is depicted. It should be appreciated that in the discussion herein, the elevator assembly 10, and components thereof, may refer to either elevator assembly 10, 10'. In this aspect, the elevator assembly 10' may include an elevator cab 12', a plurality of elevator hoisting members 14' illustrated for schematic reasons as a single suspension member, a hoistway 16' or elevator shaft, a plurality of sheaves 18', such as traction sheaves and/or idler sheaves, an example grounded frame 20', and a plurality of weights 24' that move within the example frame 20' in the system vertical direction (i.e., in the +/−Z direction). In this aspect, the plurality of elevator hoisting members 14' extend a length between the weights 24' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor such that at least one of the plurality of sheaves 18' is a device to drive the plurality of elevator hoisting members 14' through a plurality of lengths with respect to the length between the traction sheave and the contact point of the elevator cab 12'. The idler sheaves may also be mounted at various positions in the hoistway 16' including within the example frame 20'. The idler sheaves are passive (they do not drive the plurality of elevator hoisting members 14' but rather guide or route the plurality of elevator hoisting members 14'). The plurality of elevator hoisting members 14' are coupled to the elevator cab 12' to form the contact point. At least one temperature sensor 34' may be positioned within the hoistway 16'. The at least one temperature sensor 34' may output data indicative to a temperature within the hoistway 16'.

It should be appreciated that the illustrated schematics of FIGS. 1A-1B are merely examples and that the plurality of elevator hoisting members 14 routing may vary significantly or slightly from these illustrated schematics. For example, there may be several idler sheaves positioned in the hoistway 16 between the traction sheave and the contact point with the elevator cab 12.

Figure 2:
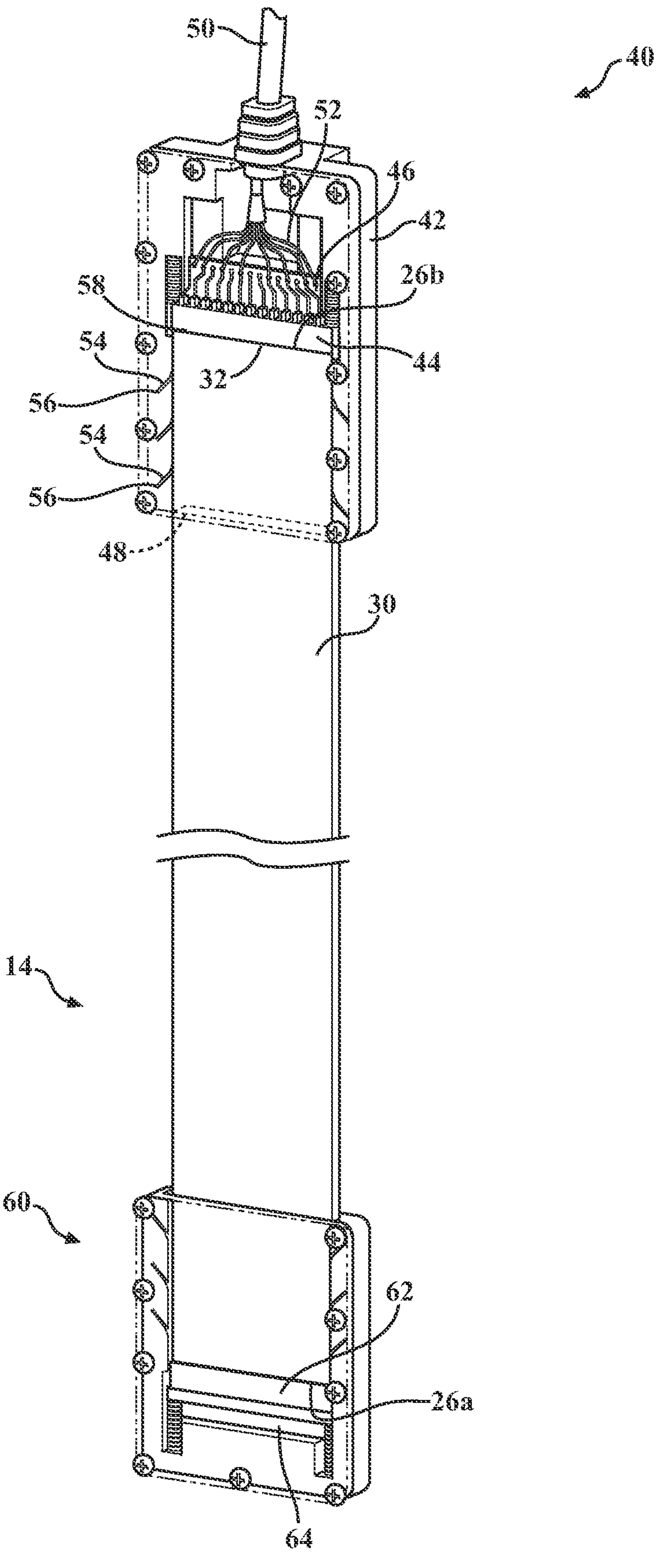
FIG. 2 schematically depicts a perspective view of a monitoring connector of FIG. 1 according to one or more embodiments shown and described herein.
Figure 3:
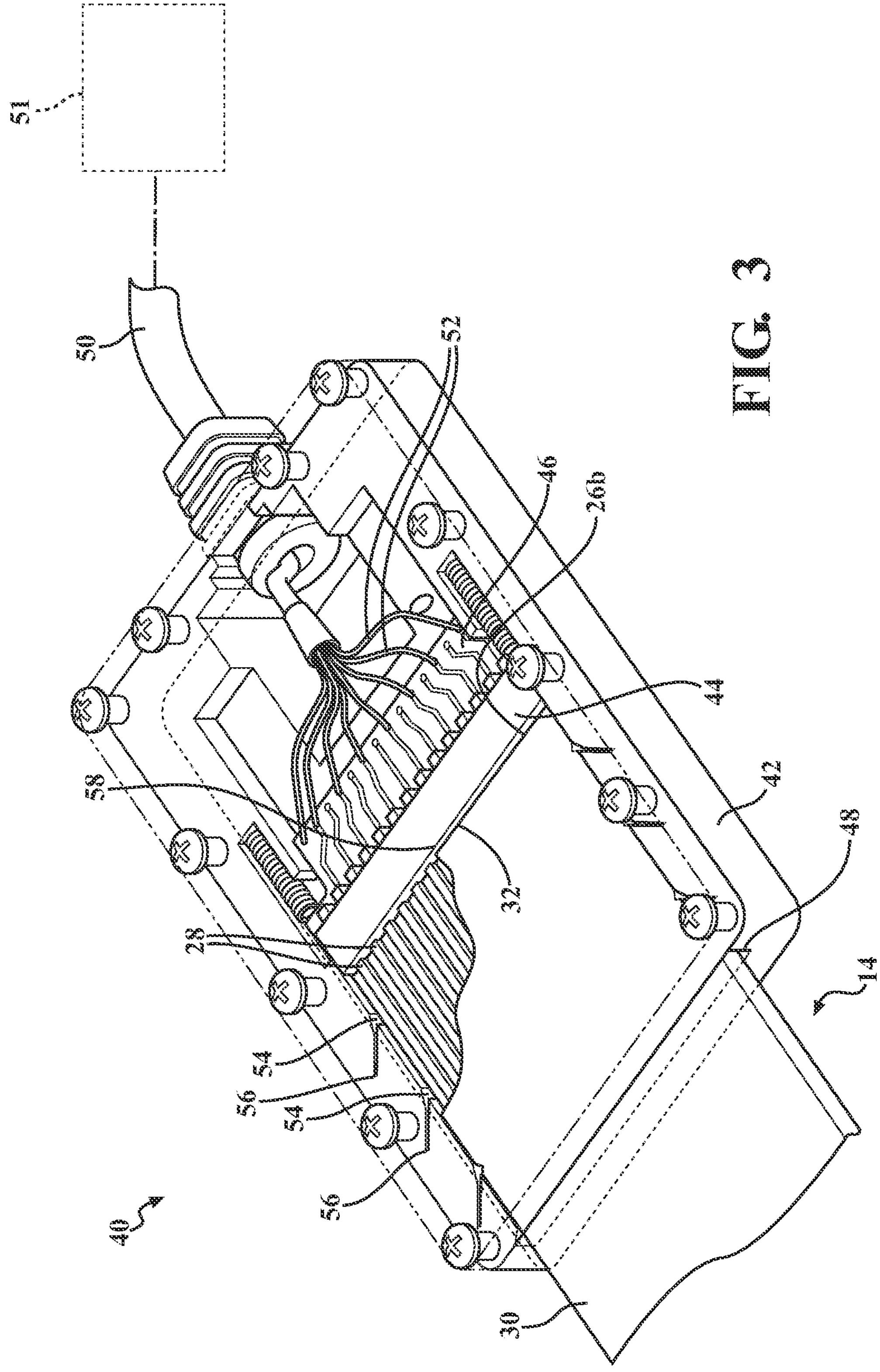
FIG. 3 schematically depicts a perspective view of the monitoring connector of FIG. 1 with a partial cutaway view of a terminal end of an exemplary elevator hoisting member on which the monitoring connector is to be installed according to one or more embodiments shown and described herein.

Referring back to FIG. 1A and now to FIGS. 2-3, the plurality of elevator hoisting members 14, may be suspension belts (as depicted in the drawing figures), ropes, cables, and the like that include a plurality of conductive members.

Each of the elevator hoisting members 14 may include one or more pairs of tensile load bearing conductive members 28 and an outer jacket 30 enclosing the one or more pairs of tensile load bearing conductive members 28. Each of the one or more pairs of tensile load bearing conductive members 28 may extend along a length of each of the elevator hoisting members 14, extending from the proximate end 26*b* to the distal end 26*a*. Further, portions of each of the one or more pairs of tensile load bearing conductive members 28, at the proximate end 26*b* and at the distal end 26*a*, may be exposed or cut to expose a terminating portion 32 of the one or more pairs of the tensile load bearing conductive members 28.

Each conductive member of the one or more pairs of tensile load bearing conductive members 28 is a load bearing tensile member disposed within the elevator hoisting member 14 that enables the elevator hoisting member 14 to support the weight of the elevator cab 12 and/or the plurality of weights 24. In embodiments, each conductive member of the one or more pairs of tensile load bearing conductive members 28 are tensile members that may be formed of a material with a high tensile strength, such as, for example, steel that is formed into braided or twisted steel wire cables, cords, ropes, or belts. Other example materials may include aramid fibers, carbon fiber, other composites and/or alloys, or combinations thereof, and/or the like. The outer jacket 30 may be formed of a nonconductive material (i.e. a material that doesn't conduct electricity), such as, for example, a polymer matrix or an outer polymer jacket of rubber, PVC and PVG, combinations thereof, similar polymers, and/or the like. As such, the elevator hoisting member 14 described herein include a plurality of internal cords or fibers, which are conductive, and are embedded within the non-conductive materials.

In some embodiments, the plurality of elevator hoisting member 14 may include any number of the one or more pairs of the tensile load bearing conductive members 28, such as seven spaced-apart one or more pairs of tensile load bearing conductive members. In other embodiments, there may be more or less than seven spaced-apart one or more pairs of the tensile load bearing conductive members. It should be understood that the plurality of elevator hoisting member 14 described herein are not limited to any particular belt type or construction, and may be, or may include, ropes, cables, belts, or alternative forms and/or configuration of the elevator hoisting member 14.

Still referring to FIGS. 2-3, an electrical monitoring connector 40 and a condition monitoring controller 51 for use with the elevator hoisting member 14 is schematically depicted. The electrical monitoring connector 40 may be configured to permit the transmitting and receiving of electrical signals for electrical monitoring by the condition monitoring controller 51 of the one or more pairs of the tensile load bearing conductive members 28 embedded within the outer jacket 30 of the elevator hoisting member 14. The electrical monitoring connector 40 may be configured to make a secure electrical connection between the terminating portion 32 of the proximate end 26*b* of the one or more pairs of tensile load bearing conductive members 28 such that the electrical monitoring connector 40 may be communicatively coupled to the terminating portion 32 of the proximate end 26*b* of the elevator hoisting member 14.

That is, the terminating portion 32 may protrude slightly from/through the outer jacket 30 of the elevator hoisting member 14 such that electrical signals may be sent and received through the electrical monitoring connector 40 and the one or more pairs of tensile load bearing conductive members 28 to actively monitor the condition thereof, as discussed in greater detail herein. In an assembled state, such as that illustrated in FIG. 2, the terminating end of the proximate end 26*b* of the elevator hoisting member 14 may contact an elastomeric connector block 44 disposed within a housing 42, as discussed in greater detail herein.

Still referring to FIGS. 1A and 2-3, the electrical monitoring connector 40 further includes a circuit board 46, such as a printed circuit board, that is affixed and electrically coupled to the elastomeric connector block 44, an insertion pocket 48 and a signal cable 50 having a plurality of wires 52 with proximal ends disposed within the housing 42 that are electrically connected to the circuit board 46 and opposing distal ends configured to be connected to the condition monitoring controller 51. The condition monitoring controller 51 includes the necessary components to be communicatively coupled to the condition monitoring system 400 (FIG. 4), as discussed in greater detail herein. That is, the condition monitoring controller 51 may have data storage, software modules, and a processor, such as those commonly found in a central processing unit, and may have multiple inputs for various signal cables 50 to be communicatively coupled to the condition monitoring controller 51 such that multiple electrical monitoring connectors 40 may be communicatively coupled thereto, which, in turn, communicatively couples each of the electrical monitoring connectors 40 to the condition monitoring system 400 (FIG. 4), as discussed in greater detail herein with respect to FIGS. 5A-5C.

The insertion pocket 48 defined in the housing 42 is configured to permit the proximate end 26*b* of the elevator hoisting member 14 to slidably be inserted therein. A plurality of teeth 54 or barbs are disposed in retention slots 56 defined in one or more side walls of the insertion pocket 48 of the housing 42.

Conductors that form a plurality of conductive layers 58 are arranged parallel to each other and perpendicular to a longitudinal direction around the elastomeric connector block 44. The conductive layers 58 may be made of any suitable electrically conductive material commonly used to make electrical signal connections, such as for example, gold, silver, copper, carbon or other such material. The conductive layers 58 are electrically connected to a trace on the circuit board 46 such that the elastomeric connector block 44 provides electrical connection redundancy to each trace of the circuit board 46 such that signals from the terminating portion 32 of the one or more pairs of tensile load bearing conductive members 28 are communicatively coupled with the elastomeric connector block 44, the circuit board 46, and/or the conductive layers 58 and the trace. As such, when in the assembled state, the condition monitoring system 400 is communicatively coupled to the one or more pairs of tensile load bearing conductive members 28 through each of the plurality of wires 52 of the signal cable 50, the circuit board 46, and the elastomeric connector block 44.

Now referring to FIG. 2, on the opposing distal end 26*a* of the elevator hoisting member 14, the electrical monitoring connector 40 may further include a passive monitoring connector 60. The passive monitoring connector 60 may be connected to the opposing distal end 26*a* and may include an elastomeric connector block 62 and a circuit board 64 to communicatively couple the terminating portion 32 of the one or more pairs of tensile load bearing conductive members 28 at the distal end 26*a*.

In the assembled state, the electrical monitoring connector 40 is inserted into the insertion pocket 48 of the housing 42. When the proximate end 26*b* of the elevator hoisting member 14 is inserted into the insertion pocket 48, the outer jacket 30 pushes past/over the plurality of teeth 54 disposed in the sidewalls of the insertion pocket 48, causing the plurality of teeth 54 to deflect and the terminating portion 32 of the proximate end 26b of each of the one or more pairs of the tensile load bearing conductive members 28 to make physical and electrical contact with the elastomeric connector block 44, the circuit board 46, and the trace in the housing 42.

In operation, the electrical monitoring connector 40 of the condition monitoring system 400 (FIG. 4) provides continuous electrical condition monitoring signals at one end of the elevator hoisting members 14, down one or more pairs of tensile load bearing conductive members 28, or cords, within the outer jacket 30 of the elevator hoisting member 14, and are then redirected back up different one or more pairs of the tensile load bearing conductive members 28 within the elevator hoisting member 14, and back to the electrical monitoring connector 40. At discrete intervals, the returned signal is analyzed by the condition monitoring controller 51 of the condition monitoring system 400 for any changes in the condition of the one or more pairs of the tensile load bearing conductive members 28 through which the signal traveled, as discussed in greater detail herein.

As such, the condition monitoring controller 51 and the electrical monitoring connector 40 are configured to send electrical monitoring signals down one or more of the wires 52, through the circuit board 46 and the elastomeric connector block 44, and down the one or more pairs of tensile load bearing conductive members 28, or tension members, embedded within the outer jacket 30 of the elevator hoisting member 14. The electrical signals travel down the one or more pairs of tensile load bearing conductive members 28 from the proximate end 26b to the distal end 26a. In other embodiments, the housing 42 may be coupled to the distal end 26a of the elevator hoisting member 14 and the passive monitoring connector 60 may be coupled to the proximate end 26b such that the electrical signals travel down one or more pairs of tensile load bearing conductive members 28 from the distal end 26a to the proximate end 26b. In yet other embodiments, the electrical monitoring connector 40 need not be connected at the distal end 26a or the proximate end 26b, and may be connected anywhere to the elevator hoisting member 14 and/or be communicatively coupled through induction, capacitation, or other wireless or near-field techniques.

Figure 4:
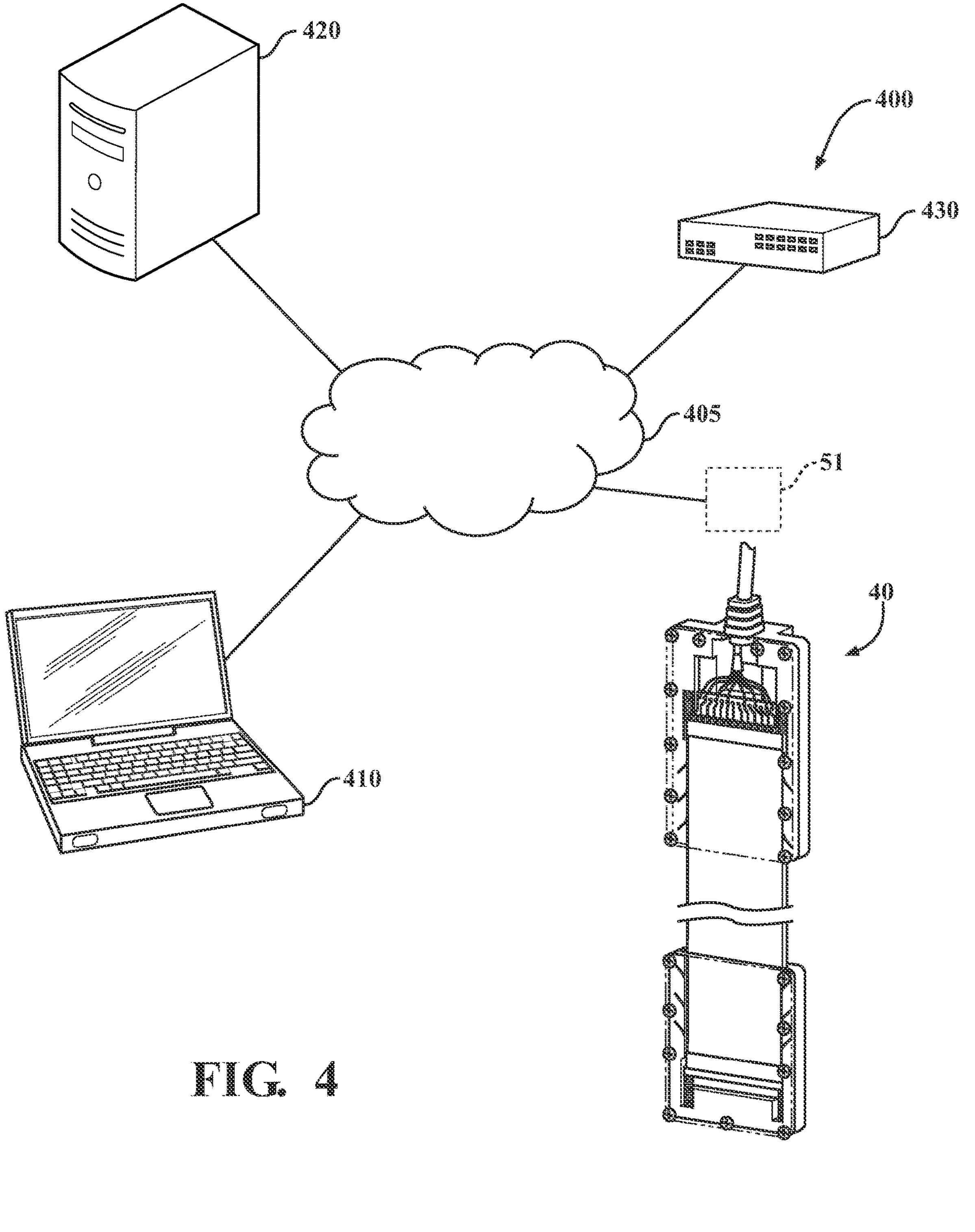
FIG. 4 schematically depicts an illustrative condition monitoring system having components for monitoring the condition of the elevator hoisting members of FIGS. 1A-1B according to one or more embodiments described and illustrated herein.

Referring now to FIG. 4, components of the illustrative condition monitoring system 400 configured to monitor the condition of the hoisting members is schematically depicted, according to embodiments shown and described herein. The condition monitoring system 400 may generally be configured to communicatively couple one or more computing devices and/or components thereof to the elevator hoisting members 14 within the elevator assembly 10 (FIGS. 1A-1B). As illustrated in FIG. 4, illustrative computing devices may include, but are not limited to, an electronic computing device 410, a server computing device 420, an elevator controller 430, and the condition monitoring controller 51. Further, it should be appreciated that these devices may be local to the elevator assembly 10 (FIG. 1A), may be remote from the elevator assembly 10 (FIG. 1A), and/or combinations thereof.

The computer network 405 may include a wide area network (WAN), such as the internet, a local area network (LAN), a mobile communications network, a public service telephone network (PSTN) a personal area network (PAN), a metropolitan area network (MAN), a virtual private network (VPN), and/or another network. Some components of the computer network 405 may be wired to one another using Ethernet (e.g., the electrical monitoring connector 40, the condition monitoring controller 51, and/or the elevator controller 430 410) or hard wired to one another using conventional techniques known to those skilled in the art.

The components and functionality of the condition monitoring controller 51 will be set forth in detail below.

Referring now to FIGS. 1A, 3 and 4, the electronic computing device 410 may generally provide an interface between a user and the other components connected to the condition monitoring system 400. In some embodiments, the electronic computing device 410 may be a user-facing device, such as any personal electronic device. For example, a laptop, mobile phone, tablet, desktop computer, and/or the like, that is positioned remote to the elevator controller 430 and/or the condition monitoring controller 51. In other embodiments, the electronic computing device 410 may be a human machine interface (HMI) or other electronic computing device positioned at and/or commutatively coupled to the elevator controller 430. The electronic computing device 410 may be used to perform one or more user-facing functions, such as receiving one or more inputs or data from the condition monitoring system 400. The electronic computing device 410 may present a user with a user interface that displays data, permits the user to interact with the data, set predetermined thresholds and adjust as necessary, and/or the like, as discussed in greater detail herein.

In some embodiments, the electronic computing device 410 may be configured to provide desired oversight, updating, and/or correction to the electrical monitoring connector 40, the condition monitoring controller 51, the elevator controller 430 and/or the server computing device 420. The electronic computing device 410 may also be used to connect additional electronic computing devices 410, electrical monitoring connectors 40, elevator controllers 430, server computing devices 420, and/or the like, to the network 405.

The condition monitoring controller 51 may receive data from one or more sources (e.g., from the electrical monitoring connector 40, the elevator controller 430, the electronic computing device 410, and/or the like), generate data, store data, index data, search data, and/or provide data to the electronic computing device 410, the server computing device, and/or the elevator controller 430 (or components thereof). In some embodiments, the condition monitoring controller 51 may employ one or more algorithms that are used for the purposes of determining a breaking strength and any undesirable conditions of each of the one or more pairs of tensile load bearing conductive members 28 of the respective elevator hoisting members 14.

For example, an electrical resistance value of each of the one or more pairs of tensile load bearing conductive members 28 of the elevator hoisting member 14 may be gathered and compared to a baseline resistance for that particular elevator hoisting member 14. The electrical resistance value may be adjusted to account for resistance drift of the elevator hoisting member 14 and the baseline resistance value is then subtracted from the adjusted electrical resistance value to calculate a difference between the baseline value and the adjusted electrical resistance value. The adjusted electrical resistance value is divided by the baseline value to formulate a drift-adjusted value for each of the one or more pairs of tensile load bearing conductive members 28 within the elevator hoisting member 14. For Example, in a seven corded pair elevator hoisting member 14, there may be seven values in the array. In some embodiments, the median value for the seven values may be determined and the absolute value of the median is calculated and input into the machine learning process.

In other embodiments, the drift-adjusted value for each of the one or more pairs of tensile load bearing conductive members 28 is an input into a machine learning process or algorithm that precisely and continuously classifies each drift-adjusted value through a plurality of decision trees with a predetermined depth such that a breaking strength model for estimating the elevator hoisting members 14 breaking strength is generated, or output, by the machine learning process or algorithm. The model estimates the breaking strength value for the elevator hoisting member 14 (e.g., a value in kilo-newton's (kN)), which is then averaged with the previous 4 generated breaking strength outputs to determine an overall moving average of breaking strength for the particular elevator hoisting member 14. As such, a predicted strength for the particular elevator hoisting member 14 is generated, which is a current condition assessment of the elevator hoisting members 14 predicted by the model.

Still referring to FIGS. 1A, 3 and 4, each of the plurality of decision trees with a predetermined depth return the breaking strength value. The breaking strength value is used to estimate the breaking strength for the elevator hoisting member 14 as a whole. These values are then used to formulate an estimated breaking strength value summation for the elevator hoisting member 14, at this particular moment, by averaging the various outputted breaking strength values over a predetermined number of measurements. The predetermined number of measurements may be taken over predetermined number of measurements that are gathered, or retrieved, over predetermined periods of time or over a number of movements of the elevator cab 12. For example, when the elevator cab 12 sits idle for a predetermined period of time, a measurement may be taken. Similarly, when the elevator cab 12 moves between landings, a measurement may be taken. Such measurements may be combined. That is, the average may include a combination of idle measurements and landing initiated measurements. As such, a moving average filter is generated for a predetermined number of historical generating breaking strengths and the actual breaking strength. For example, averaging 4 historically generated breaking strength values with the most recent breaking strength value into the moving average filter. It should be understood that the moving average filter is not limited to 5 breaking strength values and may be more or less than 5. Further, various other filters may be applied to the generated breaking strength value outputs from the algorithm without departing from the scope of this disclosure. Using filters ensure that there is a smooth data being transmitted out to the electronic computing device 410, and the elevator controller 430, as well as that there are not a false positive readings of degradation.

Moreover, the condition monitoring controller 51 may be used to produce data, such as establishing thresholds for the breaking strength of each elevator hoisting member 14, as described in greater detail herein. It should be appreciated that the electronic computing device 410 may function as the condition monitoring controller 51 such that the electronic computing device 410 performs some or all of the functionality of the condition monitoring controller 51, as discussed in greater detail herein. The components and functionality of the condition monitoring controller 51 will be set forth in detail below in FIGS. 5A-5C.

The server computing device 420 may be positioned onsite or remote to the elevator assembly 10 (FIGS. 1A-1B). The server computing device 420 may receive data from one or more sources (e.g., from the condition monitoring controller 51, the elevator controller 430, and/or the like), and may generate data, store data, index data, search data, and/or provide data to various components such as the electronic computing device 410, the elevator controller 430, and/or the like. In some embodiments, the server computing device 420 may store data from the condition monitoring controller 51 to reduce the amount of data storage held onto the condition monitoring controller 51. Further, the server computing device 420 may store data received from the elevator controller 430 such as data related to the elevator controller 430 inhibiting movement of the elevator cab 12 based on the output breaking strength of the elevator hoisting member 14 generated by the condition monitoring controller 51, as discussed in greater detail herein.

Still referring to FIGS. 1A, 3 and 4, the elevator controller 430 provides commands to the traction sheaves 18, actuators of the elevator cab 12 to open or close the doors, and/or the like. Further, the elevator controller 430 may communicate movements, or lack of movements, of the elevator cab 12 to the condition monitoring controller 51 such that the condition monitoring controller 51 may collect electrical signal samples at various predetermined movements of the elevator cab 12 or at predetermined intervals of idle time of the elevator cab 12. As such, the elevator controller 430 may receive data from various sensors, from the condition monitoring controller 51, and/or the like, and control the elevator assembly 10 through sequences of operation and real-time calculations or algorithms. As such, the elevator controller 430 may contain the requisite processing device, hardware, software, and/or the like, to perform the functionalities relating to moving elevator cabs, hoisting members, traction sheaves, doors, and the like between and stopping at landings, and/or the like, generally associated with the elevator assembly 10.

It should be understood that the illustrative condition monitoring system 400 and components thereof (e.g., the electrical monitoring connector 40 and the condition monitoring controller 51, the electronic computing device 410, the server computing device 420, the elevator controller 430, and/or the like) may gather and transform data for better estimating an actual, real time condition of the elevator hoisting member 14 rather than using merely conventional techniques such as electrical resistance readings alone or requiring a technician to be present. As such, the components of the condition monitoring system 400 transform raw data received from the electrical monitoring connector 40 and the condition monitoring controller 51 (e.g., an electrical resistance value) and using various logic modules, machine learning techniques, and/or the like, to determine any deviations from a baseline resistance and open/short circuit events, as discussed in greater detail herein. Such techniques improve accuracy of determining undesirable conditions of the elevator hoisting member 14 that affect the elevator hoisting member 14, determine the actual breaking strength of the elevator hoisting member 14 and passively inhibit movement of the elevator cab 12 when certain predetermined parameters are below threshold values for the breaking strength, as discussed in greater detail herein.

It should be understood that while the electronic computing device 410 is depicted as a personal computer, the server computing device 420 is depicted as a server, and the elevator controller 430 is depicted as a generic controller, these are merely examples. More specifically, in some embodiments, any type of computing device (e.g., mobile computing device, personal computer, server, and the like) may be utilized for any of these components. Additionally, while each of these computing devices is illustrated in FIG. 4 as a single piece of hardware, this is also an example. More specifically, each of the electronic computing device 410, the server computing device 420, and the elevator controller 430 may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 5A:
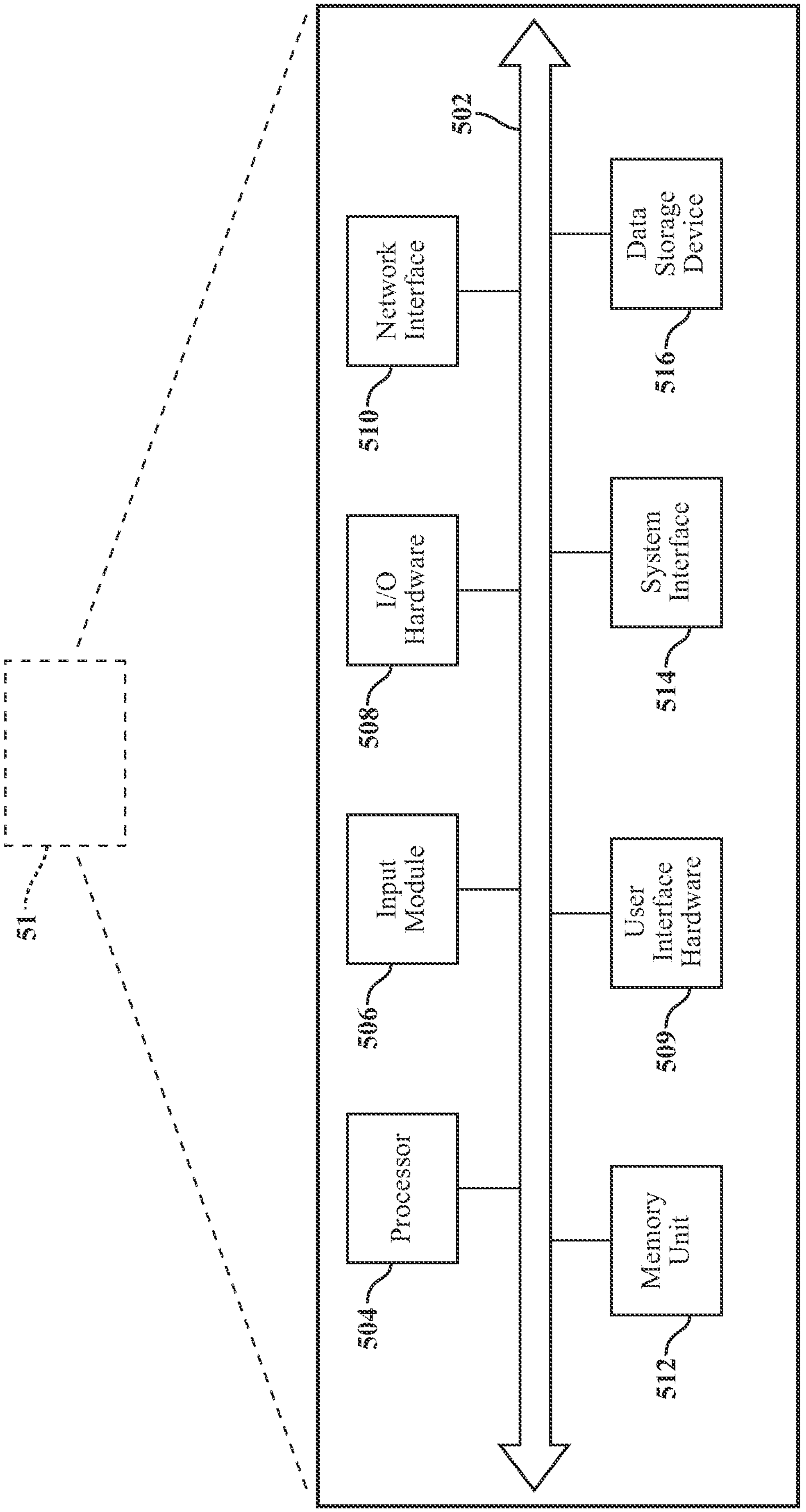
FIG. 5A schematically depicts illustrative hardware and software components of a condition monitoring controller that may be used for monitoring the condition of the elevator hoisting members according to one or more embodiments described and illustrated herein.

Now referring to FIGS. 1A and 5A, where FIG. 5A depicts the condition monitoring controller 51, further illustrating a system that identifies a condition of the elevator hoisting members 14 within the elevator assembly 10 by utilizing hardware, software, and/or firmware, according to embodiments shown and described herein. The condition monitoring controller 51 may include a non-transitory, computer readable medium configured for receiving raw data from various sources (e.g., the electrical monitoring connector 40, the elevator controller 430, and/or the like), performing the various functions described herein such as those discussed with respect to FIGS. 6-7, providing commands to automatically stop a movement of the elevator cab 12, alerting a user, and/or the like, embodied as hardware, software, and/or firmware, according to embodiments shown and described herein.

While in some embodiments, the condition monitoring controller 51 may be configured as a general purpose computer with the requisite hardware, software, and/or firmware, in other embodiments, the condition monitoring controller 51 may be configured as a special purpose computer designed specifically for performing the functionality described herein. For example, the condition monitoring controller 51 may be a specialized device that particularly receives raw data, analyzes and transforms the raw data into new data, and applies machine learning and classifying processes, or algorithms, to the new data (e.g. averages of electrical resistance values) to generate a model for determining an actual, real time, operating condition of the elevator hoisting members 14 within the elevator assembly 10. In a further example, the condition monitoring controller 51 may be a specialized device that further determines whether an open circuit or short circuit event has occurred and a number or summation of open and/or short circuit events of the elevator hoisting members 14 within the elevator assembly 10. For example, open and/or short circuit events may occur when the one or more pairs of the tensile load bearing conductive members 28 of the elevator hoisting members 14 are broken or are exposed through a break in the outer jacket 30 or sleeve of the elevator hoisting member 14 and make contact with another conductive component, respectively (e.g., short circuit to ground events).

The condition monitoring controller 51 then provides or outputs a generated data list to an external component (e.g., the electronic computing device 410 (FIG. 4)) for the purposes of improving the accuracy of passively monitoring the elevator hoisting members 14 within the elevator assembly 10. In some embodiments, the condition monitoring controller 51 determines undesirable conditions, such as a current, real time breaking strength of the elevator hoisting members 14, open and/or short circuit event detections, and/or the like, and provides results and/or generates data based on the undesirable conditions. In some embodiments, the generated data may be in the form of a stop car command to the elevator controller 430 (FIG. 4) which in turn the elevator controller 430 (FIG. 4) inhibits the elevator cab 12 from movement, as discussed in greater detail herein. In other embodiments, the condition monitoring controller 51 provides data to the user presently located at the elevator assembly 10 via the electronic computing device 410, such as an HMI, or via a display device of the condition monitoring controller 51. In other embodiments, the condition monitoring controller 51 generates and sends data to the electronic computing device 410 (FIG. 4) positioned remotely from the elevator assembly 10 as, data, an alert and/or as a notification when the undesirable condition is determined such as by highlighting the undesirable condition, sending a notification of the undesirable condition, ranking the various undesirable conditions for the various hoisting members, and/or are otherwise indicated within the displayed search results.

As also illustrated in FIG. 5A, in other embodiments, the condition monitoring controller 51 may include a processor 504, input module 506, I/O hardware 508, user interface hardware 509, network interface hardware 510, a system interface 514, a data storage device 516, which stores a database of display data 550, alert data 552, baseline resistance data 554, drift data 556, breaking strength data 558, current resistance data 560, event data 562, decision tree data 564, and a memory component 512. The memory component 512 may be non-transitory computer readable memory. The memory component 512 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 512 may be configured to store operating logic 530, display logic 532, alert logic 534, comparison logic 536, open/short circuit event logic 538, and current operating value logic 540 (each of which may be embodied as a computer program, firmware, or hardware, as an example). A local interface 502 is also included in FIG. 5A and may be implemented as a bus or other interface to facilitate communication among the components of the condition monitoring controller 51.

The processor 504, such as a computer processing unit (CPU), may be the central processing unit of the condition monitoring controller 51, performing calculations and logic operations to execute a program. The processor 504, alone or in conjunction with the other components, is an illustrative processing device, computing device, electronic control unit, or combination thereof. The processor 504 may include any processing component configured to receive and execute instructions (such as from the data storage device 516 and/or the memory component 512).

Still referring to FIG. 5A, the input module 506 may include tactile input hardware (i.e. a joystick, a keyboard, a mouse, a knob, a lever, a button, and/or the like) that allows the user to directly input settings. The I/O hardware 508 may communicate information between the local interface 502 and one or more other components of the condition monitoring system 400 (FIG. 4). For example, the I/O hardware 508 may act as an interface between the condition monitoring controller 51 and other components, such as the electronic computing device 410, and/or the like. In some embodiments, the I/O hardware 508 may be utilized to transmit one or more commands to the other components of the condition monitoring system 400 (FIG. 4).

Still referring to FIG. 5A, the user interface hardware 509 may permit information from the local interface 502 to be provided to the user, whether the user is local to the condition monitoring controller 51 or remote from the condition monitoring controller 51 (e.g., a user of the electronic computing device 410 (FIG. 4)). Still referring to FIG. 5A, the user interface hardware 509 may incorporate a display and/or one or more input devices such that information is displayed on the display in audio, visual, graphic, or alphanumeric format and/or receive inputs. Illustrative input devices include, but are not limited to, the devices discussed with respect to the input module 506, a keyboard, a touch screen, a remote control, a pointing device, a video input device, an audio input device, a haptic feedback device, and/or the like.

The network interface hardware 510 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 510 may provide a communications link between the condition monitoring controller 51 and the other components of the condition monitoring system 400 depicted in FIG. 4, including, but not limited to, the electrical monitoring connector 40, the electronic computing device 410, the elevator controller 430, and/or the like, as depicted in FIG. 4.

The system interface 514 may generally provide the condition monitoring controller 51 with an ability to interface with one or more external devices such as, for example, the electronic computing device 410, the elevator controller 430, and/or the like depicted in FIG. 4. Communication with external devices may occur using various communication ports (not shown). An illustrative communication port may be attached to a communications network.

Figure 5B:
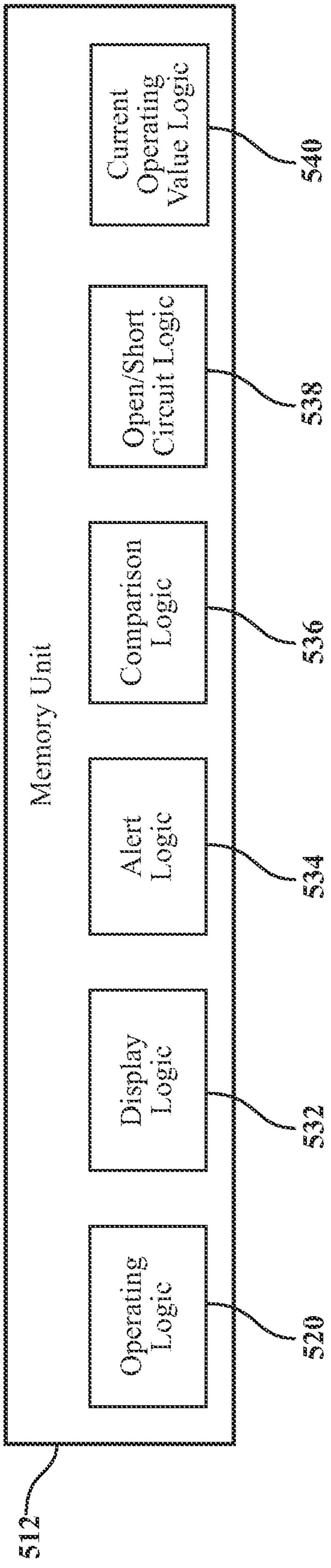
FIG. 5B schematically depicts an illustrative memory component containing illustrative logic components according to one or more embodiments shown and described herein.

With reference to FIG. 5B, in some embodiments, the program instructions contained on the memory component 512 may be embodied as a plurality of software modules, where each module provides programming instructions for completing one or more tasks. For example, FIG. 5B schematically depicts the memory component 512 containing illustrative logic components according to one or more embodiments shown and described herein. As shown in FIG. 5B, the memory component 512 may be configured to store various processing logic, such as, for example, operating logic 530, display logic 532, alert logic 534, comparison logic 536, open/short circuit event logic 538 and current operating value logic 540 (each of which may be embodied as a computer program, firmware, or hardware, as an example). The operating logic 530 may include an operating system and/or other software for managing components of the condition monitoring controller 51. Further, the operating logic 530 may contain one or more software modules for transmitting data, and/or analyzing data.

Still referring to FIG. 5B, the display logic 532 may contain one or more software modules for converting data into a display, such as on-demand graphical representations of the hoisting member breaking strength, open/short circuit events, and the like, displaying currently actual, or real time hoisting member breaking strength, open/short circuit events, and/or display of notifications and/or alerts to the user, as will be discussed in greater detail herein.

The alert logic 534 may contain one or more software modules for generating an elevator stop car command when the breaking strength value is at or below certain predetermined thresholds, alerting or notifying the user when the breaking strength value is at, or below certain predetermined thresholds, and/or the like. The alert may be an audio alert, such as an audible sound, a text alert, such as a push notification warning on a screen of the electronic computing device 410 (FIG. 4), a command to the elevator controller 430 (FIG. 4), a combination thereof, and/or the like. The alert may be preselected from a plurality of alert types.

The comparison logic 536 may contain one or more software modules for receiving a signal indicative of a resistance data from the electrical monitoring connector 40 (FIG. 3) communicatively coupled to the elevator hoisting members 14 (FIG. 3) within the elevator assembly 10 (FIG. 1A). The comparison logic 536 may include and/or use a lookup table and/or the like that establishes a correlation or comparison between a baseline resistance data (e.g., a data value gathered and stored when the elevator hoisting member 14 was newly installed or otherwise in a desirable condition) and the current resistance data (e.g., a raw data currently gathered from the electrical monitoring connector 40). The comparison logic 536 may perform calculations to use as inputs into a machine learning algorithm. For example, the comparison logic 536 may adjust the current resistance data to account for drift of the measured resistance value in the elevator hoisting members 14 (FIG. 3) over time when compared to the baseline measured resistance value (e.g., when the elevator hoisting member 14 was known to be in acceptable condition), subtract the baseline value from the drift-adjusted readings and divide the difference by the baseline resistance data. The comparison logic 536 may then use the drift-adjusted readings compared against the baseline value as the inputs into the machine learning algorithm such as a classification, regression and/or other tasks learning algorithm to build an accurate model for the breaking strength of the elevator hoisting member 14 as the output data. As such the drift of the measured resistance values may be related to the changing of the measured resistance overtime, which is accounted for as discussed above and herein.

For example, a random forest artificial intelligence (AI) classification may be used that operates by constructing a multitude of decision trees at training time such that a plurality of data and outcomes may be generated, and the most popular or most frequent outcome is usually adopted. That is, a random forest is known as a machine learning process that uses multiple probabilistic decision trees to formulate multiple outcomes in which the most frequent outcome is used as the model or prediction. The weights of each tree are trained with new adjusted resistance data gathered from the calculations described above and then the new adjusted resistance data values are fed through the forest (i.e., a plurality of uncorrelated decision trees) and the algorithm outputs an ensemble of a prediction that estimates an actual, or current, real time breaking strength of the elevator hoisting member 14 as a model. As such, each data value is used to walk through a pre-determined number of trained trees of a pre-determined depth. Each tree within the forest may return, as an output, a breaking strength in kilo-Newton's (kN) in which the algorithm outputs the most likely value that corresponds to the actual breaking strength of the elevator hoisting members 14 (FIG. 3). The breaking strength values for the elevator hoisting members 14 (FIG. 3) are then averaged over a predetermined number of occurrences, as a moving filter, to determine the overall predicted strength for the elevator hoisting member 14 (FIG. 3). It should be appreciated that there may be multiple iterations of this technique before the model is adopted.

In some embodiments, the breaking strength prediction may be manually increased by an offset value. The offset value may account for any change in the elevator hoisting member 14 due to temperature, debris, stretching, and/or the like. In a non-limiting example, the offset value may be 5 kN. The comparison logic 536 may further contain one or more software modules for generating the moving average filter to smooth the breaking strength predictions. That is, the comparison logic 536 may generate the moving average to ensure that a minimum number of consecutive breaking strength determinations occur to validate the data and to ensure that the breaking strength of one or more pairs of tensile load bearing conductive members positioned within an outer jacket of the elevator hoisting member have actually deteriorated (e.g., elimination of false determinations).

Still referring to FIG. 5B and back to FIGS. 1A and 3, the open/short circuit event logic 538 may contain one or more software modules for detecting open/and short circuit events occurring in the various elevator hoisting members 14 of the elevator assembly 10. An open circuit event may be when the hoisting members' one or more pairs of the tensile load bearing conductive members 28 (FIG. 3) are broken such that a disconnect occurs either within or external to the outer jacket 30 (FIG. 3). As such, a resistance value may not be able to be received as the electrical path is broken, or open. A short circuit event may be when the elevator hoisting members' one or more pairs of the tensile load bearing conductive members 28 are exposed through a break in the outer jacket 30 such that a portion of the one or more pairs of the tensile load bearing conductive members 28 make contact or touch another conductive component to short the electrical return path to a ground, such as the sheave 18 to the grounded frame 20.

The current operating value logic 540 may contain one or more software modules for initiating the condition monitoring controller 51 and/or the electrical monitoring connector 40 to receive a signal indicative of the electrical resistance of the elevator hoisting member 14 (FIG. 3). It should be appreciated that an AC signal or a DC signal is continuously applied to the pairs of tensile load bearing conductive members 28 and only the gathering of the electrical resistance is performed at predetermined discrete times. In some embodiments, the gathering of the electrical signals may be at predetermined time intervals when the elevator cab 12 (FIG. 1A) sits idle. For example, and without limitation, every two hours. In other embodiments, the gathering of the electrical signals may be based on running or movement of the elevator cab 12 (FIG. 1A). For example, the initiation may occur after a predetermined number of floor movements, at each landing, and/or the like.

Still referring to FIGS. 1A, 3 and 5B, it should be understood that the current operating value logic 540, comparison logic 536, the open/short circuit event logic 538, the display logic 532, and the alert logic 534 may simultaneously operate, in real time, and may determine when the breaking strength value of the elevator hoisting members 14, is at, or below, predetermined thresholds, and/or when a number of open/short events occur, and to alert the user, the elevator controller 430 (FIG. 4) and/or display the data such that a maintenance technician may be contacted to repair and/or replace the elevator hoisting members 14 of the elevator assembly 10 when an undesirable condition is detected. As such, the condition for each elevator hoisting member 14 of the elevator assembly 10 may be remotely and passively monitored and/or tracked to monitor data related to determining the current conditions for each elevator hoisting members 14 of the elevator assembly 10. Therefore, unknown undesirable conditions of the elevator hoisting member 14 are eliminated as well as prematurely replacing the elevator hoisting members 14 may be eliminated. The embodiments described herein model a breaking strength to monitor the condition of the elevator hoisting members 14 such that the elevator controller 430 (FIG. 4) may be alerted to shut down movement of the elevator cab 12 and alert users when undesirable conditions are present, such as when a predetermined threshold is met for repairing, investigating, and/or replacing the elevator hoisting member. Further, the embodiments described herein may use the modeling to monitor the elevator hoisting members to accurately determine a breaking strength to replace the elevator hoisting member 14 prior to a failure.

Figure 5C:
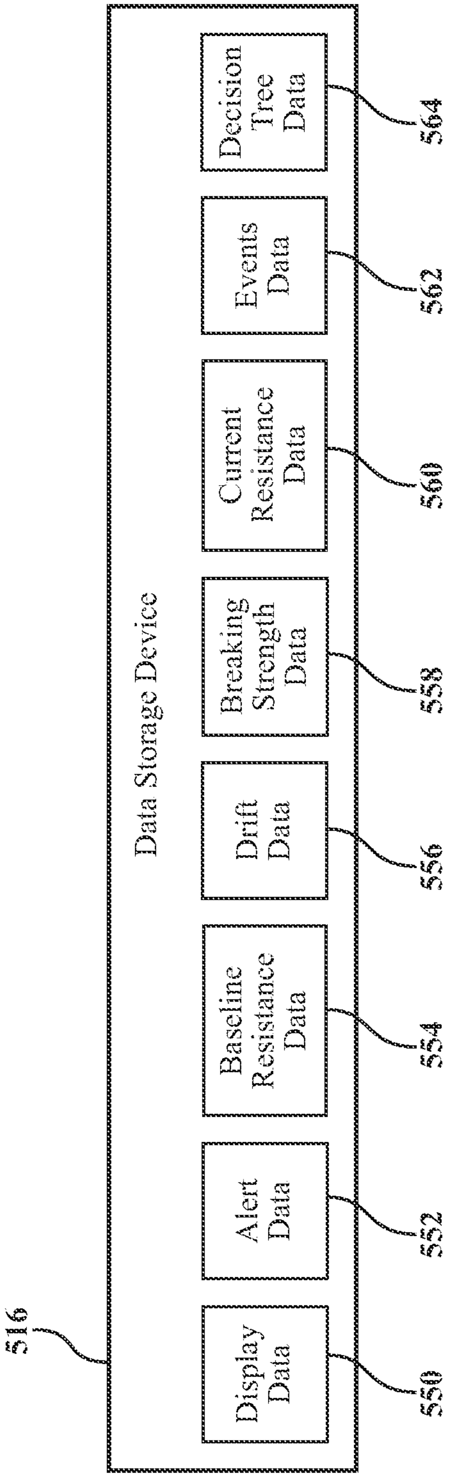
FIG. 5C schematically depicts an illustrative data storage device containing illustrative data components according to one or more embodiments shown and described herein.

FIG. 5C schematically depicts a block diagram of various data contained within a storage device (e.g., the data storage device 516). It should be understood that the data storage device 516 may reside local to and/or remote from the condition monitoring controller 51 and may be configured to store one or more pieces of data for access by the condition monitoring controller 51 and/or other components, identify the breaking strength value of the elevator hoisting member 14 (FIG. 3), and determine whether an alert should be sent to the elevator controller 430 (FIG. 4) or notification should be pushed to the user via the electronic computing device 410 (FIG. 4).

As shown in FIG. 5C, the data storage device 516 may include, for example, a plurality of display data 550, such as data related to the breaking strength, the open circuits and/or short circuits, and the like, that may be displayed graphically, such as a line chart, indicators, bar charts, column charts, pie charts, area charts, pivot tables, bubble charts, tree maps, polar charts, scatter charts, and/or the like.

Still referring to FIG. 5C and back to FIGS. 1A and 3, the data storage device 516 further includes the alert data 552, such as different predetermined or user customized threshold values for the estimated breaking strength value. For example, the alert data 552 may include data related to various output fault states. For instance, the alert data 552 may be populated with data related to at least one threshold level with respect to the various breaking loads for the type of the elevator hoisting member 14 that is monitored. For example, a first threshold level may be set for any estimated breaking strengths that are above a predetermined degradation threshold. That is, the current conditions of the elevator hoisting member 14 has minimal degradation and no action is required. The alert output for such as threshold may be as a minimal degradation or no fault condition.

A second threshold level may encompass a second range of predetermined breaking strengths. The second threshold level is less than the first threshold level, and may alert the user when the predetermined breaking strength is within a range or at the second threshold level because some degradation is occurring to the elevator hoisting member 14. An alert at this level may require a technician to perform additional checks, maintenance, further investigation, and/or the like, on the elevator hoisting member 14. A third threshold level may encompass any estimated breaking strengths that fall below a minimum operational breaking strength. The third threshold level is less than both the second and the first threshold levels indicating that significant degradation is occurring to the elevator hoisting member 14. An alert at the third threshold level may be sent to the elevator controller 430 (FIG. 4) to inhibit further movement of the elevator cab 12, 12' (FIGS. 1A-1B) and may require a technician to replace the elevator hoisting member 14.

In a non-limiting example, the first threshold level may be when the estimated breaking strength is 90 percent of the predetermined breaking load of the elevator hoisting member 14. For example, the predetermined breaking load of the elevator hoisting member 14 may be 60 kN. As such, when the estimated breaking strength is at or better than 90 percent of the predetermined breaking load (e.g., 60 kN) of the elevator hoisting member 14, such as when the estimated breaking strength is 55 kN, the first threshold level may be met. The second threshold level may be when the estimated breaking strength is at or above 80 percent but less than 90 percent of the predetermined breaking load of the elevator hoisting member 14. For example, when the estimated breaking strength is between 80 percent and 90 percent of the predetermined breaking load, such as when the estimated breaking strength is at 52 kN, the second threshold level may be met. The third threshold level may be when the estimated breaking strength is below 80 percent of the predetermined breaking load of the elevator hoisting member 14. For example, when the estimated breaking strength is less than 80 percent of the predetermined breaking load, such as when the estimated breaking strength is at 44 kN, the third threshold level may be met.

It should be appreciated that the estimated breaking strength may be an averaged breaking strength summation between multiple estimated breaking strength values, such that erroneous alerts notifications are not generated or pushed to the user, as discussed in greater detail herein.

The data storage device 516 further includes the baseline resistance data 554. The baseline resistance data 554 may include a baseline resistance data gathered when the elevator hoisting member 14 was installed and/or in a desirable condition, and may be based on the type and condition of the elevator hoisting member 14. For example, a braided belt type may have a different resistance baseline than a corded type belt. Further, the baseline resistance may be different for different length elevator hoisting members. For example, the baseline resistance of the elevator hoisting member 14 that is 200 feet in length may be different than the elevator hoisting member 14 that is 50 feet in length.

Still referring to FIGS. 1A, 3 and 5C, the data storage device 516 may further include the drift data 556. The drift data 556 may include data related to the drift over time resistance value of each elevator hoisting member 14. The drift over time of each elevator hoisting member 14 may include changes in measured resistance values for the one or more pairs of the tensile load bearing conductive members 28 due to various factors, such as temperature variances within the hoistway 16. That is, temperature changes in the hoistway 16 may influence or change the current, or real-time measured resistance values, which is accounted for by the determination of the drift over time of the measured resistance values, as discussed below and herein. This determined data may be stored in the draft data 556. The drift data 556 may further include data populated by the at least one temperature sensor 34. For example, the temperature within the hoistway 16 at 8:00 AM may be vastly different than the temperature within the hoistway 16 at 3:00 PM. As such, the temperature variance may be offset to eliminate erroneous data. Additionally, the because the resistance measured data may drift over time and may be changed by other factors, a baseline resistance measurement for each pair of the one or more pairs of the tensile load bearing conductive members 28 is determined and stored in the baseline resistance data 554. For each subsequent resistance measurement, the baseline is subtracted from the newly gathered resistance value to get a specific measurement of drift of the measured resistance over time from the baseline resistance measurement. The median value of the measured resistance of the one or more corded pairs of tensile strength conductive members 28 value is determined and stored in the drift data 556. The absolute value is calculated for each of the subsequent measurements, which is stored in the draft data 556 and is used as an input into the machine learning process, as discussed in greater detail herein.

In a non-limiting example, a baseline resistance measurement of seven corded pairs of tensile strength conductive members 28 is determined and stored, one value for each corded pair. In some embodiments, for this non-limiting example, the baseline resistance measurement may be converted and stored as, for example and non-limiting, a 1×7 array or matrix, one value of each corded pair. Subsequent resistance measurements are taken, as discussed herein. These newly gathered values are subtracted from the stored baseline resistance measurement, which may result into a drift value array or matrix (e.g., a 1×7 due to seven corded pairs). The drift value array may be converted and stored as one drift value of the live, real-time resistance measurements drift difference from the baseline resistance measurement for that specific measurement. The median value of draft value array or matrix is determined and an absolute value of the determined median value is determined and used as the input for the machine learning process.

The data storage device 516 may further include the breaking strength data 558. The breaking strength data 558 may be the data computed through the various machine learning algorithms discussed herein and is used to model and average the breaking strength value of the monitored elevator hoisting member. As such, the breaking strength value may be compared or used with the predetermined threshold levels of the elevator hoisting member, as described with respect to the alert data 552 described above. As such, each elevator hoisting member may have a different breaking strength value depending on the length of the elevator hoisting member, size of the elevator hoisting member, type and number of tensile members of the elevator hoisting member, and/or the like.

The data storage device 516 may further include the current resistance data 560. The current resistance data 560 may be data received from the electrical monitoring connector 40 (FIG. 3) indicative of an electrical resistance of the one or more pairs of tensile load bearing conductive members 28 (FIG. 3) of the elevator hoisting member 14. The data storage device 516 may further include the event data 562. The event data 562 may keep an up count of the number or determined open and/or short events that occur for the elevator hoisting member 14.

The data storage device 516 further includes the decision tree data 564. The decision tree data 564 may include data related to the model including data related to number of trained trees to use in the process or algorithm, the predetermined depth of the trees, and/or the like. The number of trained trees to use in the algorithm, the predetermined depth of the trees and/or the like, may have an impact of the accuracy of the model and the output thereof. Creating the model for the stored decision tree data is discussed in greater detail herein.

As mentioned above, the various components described with respect to FIGS. 5A-5C may be used to carry out one or more processes to improve accuracy of determining undesirable conditions of the elevator hoisting members within an elevator assembly using machine learning processes to improve the condition monitoring of the elevator hoisting members, alerting the user when certain predetermined parameters are below the threshold value for breaking strength or above a number of open/shorts, and displaying, in real time, the current operating conditions of the elevator hoisting member based on the models generated.

Further, it should be understood that the components depicted in FIGS. 5A-5C are merely illustrative and are not intended to limit the scope of this disclosure. More specifically, while the components in FIGS. 5A-5C are illustrated as residing within the condition monitoring controller 51, this is a non-limiting example. In some embodiments, one or more of the components may reside external to the condition monitoring controller 51. Similarly, while FIGS. 5A-5C is directed to the condition monitoring controller 51, other components such as the electronic computing device 410, the server computing device 420, and/or the elevator controller 430, as depicted in FIG. 4, may include similar hardware, software, and/or firmware.

Training the Machine Learning Algorithm

As discussed herein, the machine learning algorithm may be a supervised learning process or algorithm that builds an ensemble of decision trees trained with different depths and data to output, build or generate a breaking strength model, which in turn is used to establish or estimate the actual breaking strength value of the one or more pairs of tensile load bearing conductive members 28 within the elevator hoisting members 14. The training data for the machine learning algorithm may be based on correlating data obtained from subjecting the one or more pairs of tensile load bearing conductive members 28 to advance degradation. Data used in the training may be related to subjecting the one or more pairs of tensile load bearing conductive members 28 to a DC current, through saltwater, to a steel pot causing a loss of cross-sectional area of the one or more pairs of tensile load bearing conductive members 28. The electrical resistance is then measured and compared to a baseline electrical resistance of itself when the one or more pairs of tensile load bearing conductive members 28 were known to be undamaged or a desirable elevator hoisting member. As such, measurements may be taken from the one or more pairs of tensile load bearing conductive members 28 before corrosion and then afterwards. Another example may be to physically bend until failure the one or more pairs of tensile load bearing conductive members 28 and record the residual strength. Another example may be to physically bend the one or more pairs of tensile load bearing conductive members 28 for a predetermined number of hours (e.g., 40,000) to advance fatigue and record the residual strength. Another example may be to overload the one or more pairs of tensile load bearing conductive members 28 for a predetermined number of hours (e.g., 40,000) to advance fatigue and record the residual strength.

As such, the machine learning algorithm is populated at training time with the various data related to when there is a physical break, fatigue, open/short events, overload, bending, and/or the like, to formulate and determine the rules necessary to conduct the estimation of breaking strength, as discussed in greater detail herein.

Generating a Model

Figure 6:
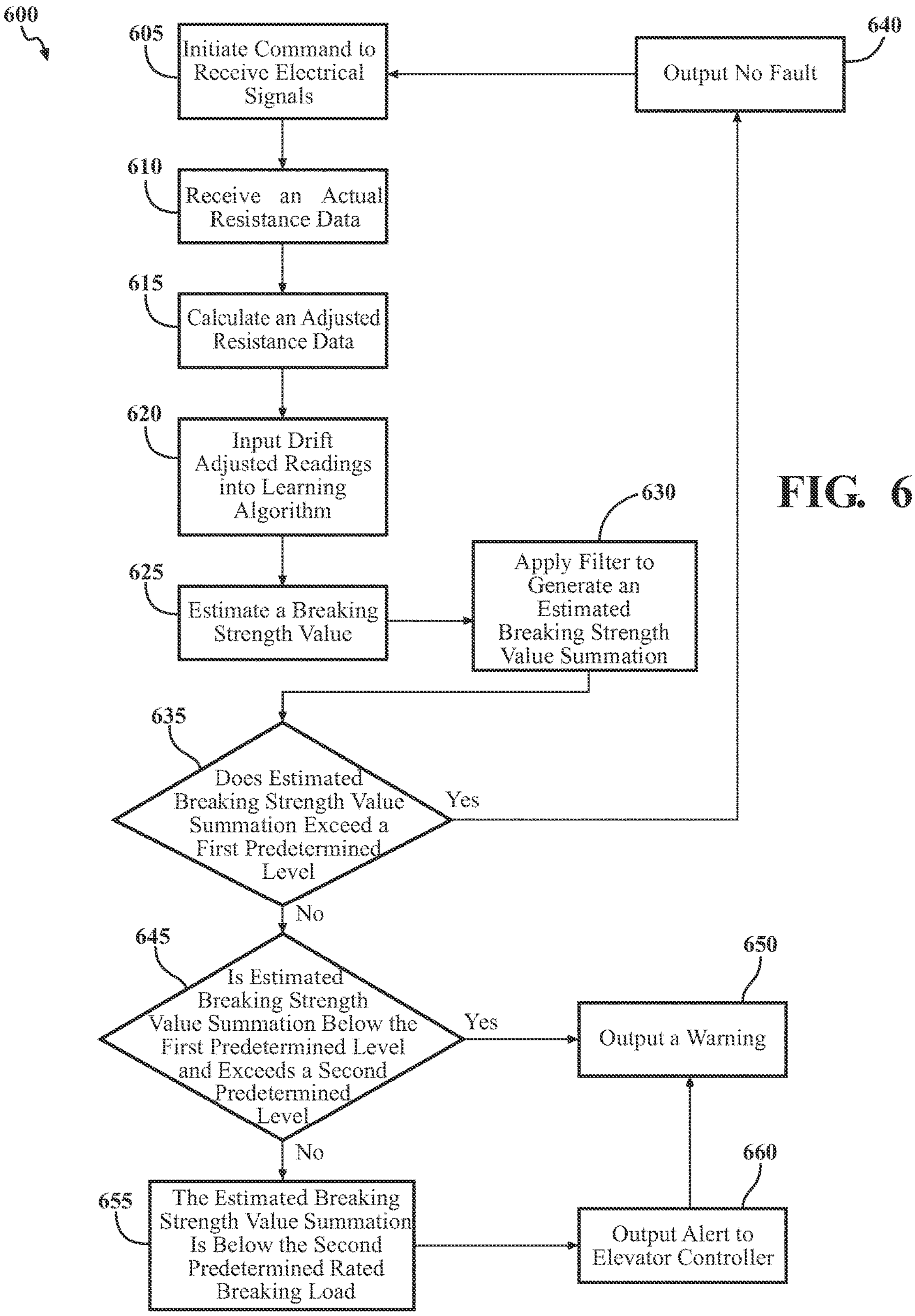
FIG. 6 depicts a flow diagram of an illustrative method for generating a model indicative of a condition of an elevator hoisting member according to one or more embodiments shown and described herein.

Referring back to FIGS. 2-5 and now to FIG. 6, a flow diagram that graphically depicts an illustrative method 600 of generating a model indicative of an elevator hoisting members' condition is provided. Although the steps associated with the blocks of FIG. 6 will be described as being separate tasks, in other embodiments, the blocks may be combined or omitted. Further, while the steps associated with the blocks of FIG. 6 will be described as being performed in a particular order, in other embodiments, the steps may be performed in a different order.

At block 605, the condition monitoring controller 51 may instruct the electrical monitoring connector 40, via a measurement command, to gather electrical signals samples from the one or more pairs of tensile load bearing conductive members 28 within the elevator hoisting members 14 by actively collecting, sampling, and/or measuring the electrical resistance for each of the one or more pairs of tensile load bearing conductive members 28 positioned within the elevator hoisting member 14. In some embodiments, each paired conductive member of the one or more pairs of tensile load bearing conductive members 28 may form its own monitored circuit such that it is measured individually, or in alternate embodiments, two or more pairs of conductive members of the one or more pairs of tensile load bearing conductive members 28 may be electrically connected together in series, parallel, or other configurations as needed, to be monitored together. In other embodiments, impedance monitoring, power monitoring, capacitance monitoring and/or the like may be used in addition to or to replace the electrical resistance monitoring.

At block 610, the current electrical resistance data is received or obtained by the condition monitoring controller 51 (e.g., the data is transmitted from the electrical monitoring connector 40 to the condition monitoring controller 51). The current electrical resistance data may be obtained from the electrical monitoring connector 40 and correspond to the one or more pairs of tensile load bearing conductive members 28 of the elevator hoisting members 14. The current electrical resistance data may be raw data. That is, unfiltered or non-manipulated data is provided to the condition monitoring controller 51 directly from the electrical monitoring connector 40 and/or from other devices, such as the elevator controller 430, the electronic computing device 410, and/or the like. At block 615, an adjusted resistance data may be calculated by the condition monitoring controller 51. The adjusted resistance data may be a calculation to account for a baseline comparison between the baseline electrical resistance data and the current electrical resistance data.

In the performing of the adjusted resistance data calculations, the current electrical resistance value of each of the one or more pairs of tensile load bearing conductive members 28 of the elevator hoisting member 14 may be compared to a baseline electrical resistance value for that particular elevator hoisting member 14. The current electrical resistance value may be adjusted to account for drift of the elevator hoisting member 14 and the baseline electrical resistance value is then subtracted from the adjusted electrical resistance value to calculate a difference between the baseline electrical resistance value and the adjusted electrical resistance value. The adjusted electrical resistance value may then be divided by the baseline electrical resistance value to formulate a drift-adjusted value for each of the one or more pairs of tensile load bearing conductive members 28 within the elevator hoisting member 14.

At block 620, each drift-adjusted value is an input into a machine learning algorithm. The machine learning algorithm may utilize a plurality of decision trees with a predetermined depth to generate a breaking strength model for estimating the elevator hoisting member 14 breaking strength, at block 625. The breaking strength model may be an estimation of the actual breaking strength of the elevator hoisting member 14 (e.g., a value in kilo-newton's (kN)), known as a breaking strength value. The breaking strength value is then averaged by a filter, using a predetermined number of consecutively generated historical breaking strength values gathered at various previous measurement intervals. The filter generates an output of the estimated breaking strength value summation for the elevator hoisting member 14, at block 630, at the current moment in time. The filter may be applied to output a current operating condition assessment of the elevator hoisting members 14 predicted by the model.

That is, each of the plurality of decision trees with a predetermined depth output the actual, or real time, estimated breaking strength value data for the elevator hoisting member 14. The actual breaking value along with a predetermined number of consecutive historical breaking strength values are then averaged together by the filter to formulate the estimated breaking strength value summation for the elevator hoisting member 14. For example, the moving average may be averaging 5 readings for each generated breaking strength value (e.g., one current, or real time value, and the previous consecutive 4 historical values). Further, the filter may be applied to ensure that there is a smooth data being transmitted to the elevator controller 430 (FIG. 4), the electronic computing device 410 (FIG. 4) and/or the like, such that there are not false alerts of degradation. In some embodiments, the filter is a moving average filter. This is non-limiting and other types of filters may be used.

At block 635, when the estimated breaking strength value summation for the elevator hoisting member 14 exceeds a first predetermined threshold level based on a rated breaking load, then, at block 640, a no fault is output. That is, the elevator hoisting member is within an acceptable operating condition range. As such, the elevator assembly 10 operates normally. The rated breaking load may vary for each specific type, length, material, and/or the like, of the respective elevator hoisting member 14.

When the estimated breaking strength value summation for the elevator hoisting member 14 exceeds the first predetermined threshold level based on a rated breaking load, then the method 600 returns to block 605, and keeps looping through blocks 605 through 640 until the estimated breaking strength value summation for the elevator hoisting member 14 does not exceed the first predetermined threshold level.

If, at block 635, the estimated breaking strength value summation for the elevator hoisting member 14 fails to meet the first predetermined threshold, then at block 645, the estimated breaking strength value summation for the elevator hoisting member 14 is evaluated against a second predetermined threshold level based on the rated breaking load. The second threshold level is less than the first threshold level. When the estimated breaking strength value summation for the elevator hoisting member 14 fails to exceed the first predetermined threshold level, but meets or exceeds the second predetermined threshold level, at block 645, a warning is output at block 650. Such a warning may be displayed by the condition monitoring controller 51, the electronic computing device 410, and/or the like, and may require a technician to perform additional checks on the elevator hoisting members 14.

If, at block 645, the estimated breaking strength value summation for the elevator hoisting member 14 fails to meet the second predetermined level, then at block 655, a determination is made that the estimated breaking strength value summation for the elevator hoisting member 14 is below the second predetermined level. When the estimated breaking strength value summation for the elevator hoisting member 14 is below the second predetermined level, at block 660, an alert command is sent automatically to the elevator controller 430, which in turn, the elevator controller 430 will inhibit future movements of the elevator hoisting member 14. As such, movement of the elevator cab 12 is prohibited passively without requiring human or manual intervention. Further, a warning or notification may be issued to the user, at block 650. The alert or notification may be an escalated push notification or visual indicator to the user or technician via the electronic computing device 410 and/or the condition monitoring controller 51, that the condition of the elevator hoisting member 14 requires replacing.

In a non-limiting example, the first threshold level may be when the estimated breaking strength value summation for the elevator hoisting member 14 is 90 percent of the rated breaking load of the elevator hoisting member 14. The second threshold level may be when the estimated breaking strength value summation for the elevator hoisting member 14 is at or above 80 percent but less than 90 percent of the rated breaking load of the elevator hoisting member 14. The third threshold level may be when the estimated breaking strength value summation for the elevator hoisting member 14 is below 80 percent of the rated breaking load of the elevator hoisting member 14.

Figure 7:
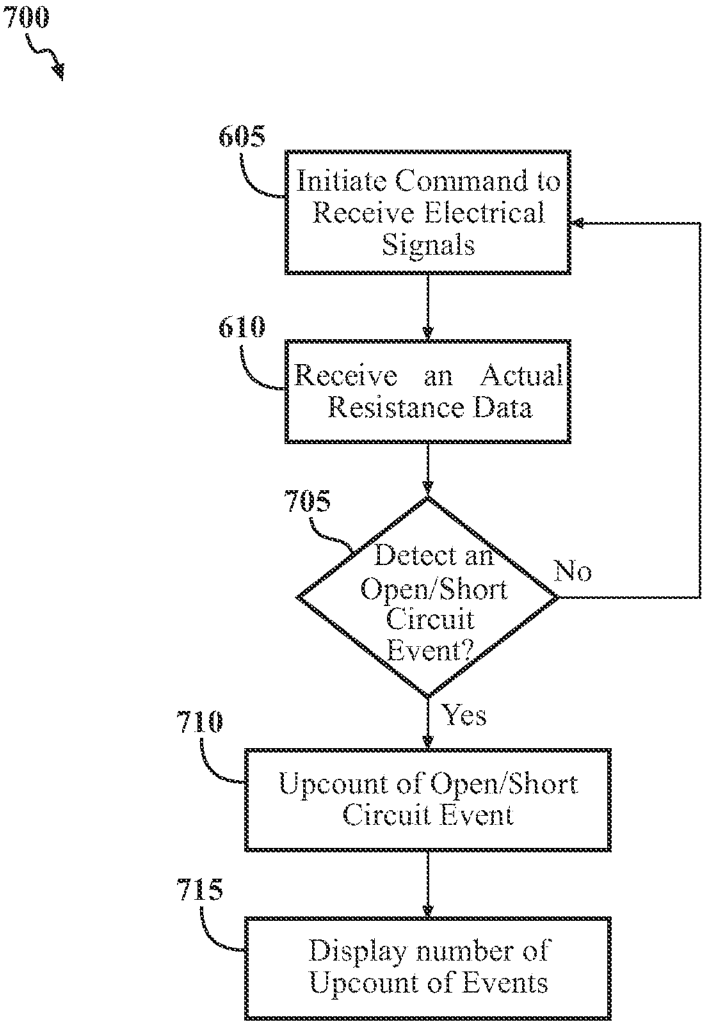
FIG. 7 depicts a flow diagram of an illustrative method for determining an open/short circuit event according to one or more embodiments shown and described herein.

Referring still to FIGS. 2-5 and now to FIG. 7, a flow diagram that graphically depicts an illustrative method 700 of determining an open/short circuit event is provided. Although the steps associated with the blocks of FIG. 7 will be described as being separate tasks, in other embodiments, the blocks may be combined or omitted. Further, while the steps associated with the blocks of FIG. 7 will described as being performed in a particular order, in other embodiments, the steps may be performed in a different order.

At block 605, the condition monitoring controller 51 may instruct the electrical monitoring connector 40, via a measurement command, to gather electrical signals samples from the one or more pairs of tensile load bearing conductive members 28 within the elevator hoisting members 14 by actively collecting, sampling, and/or measuring the electrical resistance for each of the one or more pairs of tensile load bearing conductive members 28 positioned within the elevator hoisting member 14, as discussed above. At block 610, the current electrical resistance data is received and/or obtained by the condition monitoring controller 51 (e.g., the data is transmitted from the electrical monitoring connector 40 to the condition monitoring controller 51). The current electrical resistance data may be obtained from the electrical monitoring connector 40 and correspond to the one or more pairs of tensile load bearing conductive members 28 of the elevator hoisting members 14, as discussed above.

At block 705, the condition monitoring controller 51 determines whether an open/short circuit event has occurred. This determination may be when the request for the electrical signal occurs at block 605, but the current electrical resistance data obtained, at block 610, is zero or undetermined. As such, it is determined that one of the pairs of tensile load bearing conductive members 28 is broke, causing an open circuit/short circuit, or a portion of the one of the pairs of tensile load bearing conductive members 28 are in contact with other conductive components, such as the sheaves 18. That is, a known current may be passed through the one of the pairs of tensile load bearing conductive members 28 and if no current reaches connector at end of elevator hoisting member 14, then the open/short circuit event occurs. A comparative circuit may be used to determine whether the received resistances are within reasonable deviations.

When the open/short circuit event has not occurred, the method 700 returns to block 605, and keeps looping through blocks 605, 610 and 705 until the open/short event is detected. When the open/short event is detected at block 705, then an up-count of the open/short event is saved in the data storage device 516, at block 710.

At block 715, the current number of up-count events is displayed at the request of the user. The display may be on the display device of the condition monitoring controller 51, the electronic computing device 410, and/or the like. The current number of up-count events may be time stamped or otherwise categorized such that a technician would be able to determine which portion of the elevator hoisting member 14 is damaged by when it makes contact with different sheaves 18 within the elevator assembly 10. That is, should the current number of up-count events only occur at a certain point in time when the elevator hoisting member 14 is in contact with a specific sheave 18, then the technician may be able to determine where the exact damage is to the elevator hoisting member 14. Alternatively, should the current number of up-count events occur at every sheave within the elevator assembly 10, this may be an indication to the technician that the entire elevator hoisting member 14 needs to be replaced.

In some embodiments, similar to outputs for no fault at block 640 (FIG. 6) and/or the warning at block 650 (FIG. 6) the current number of up-count events may be compared to an open/short circuit event threshold level and, if the current number of up-count events is less than the open/short circuit event threshold level, then an output of no fault is generated, and if the current number of up-count events exceeds the open/short event threshold level, then an output of the warning is generated.

It should be understood that the methods 600 and 700 described herein may be simultaneously evaluating the current operating conditions of the elevator hoisting member 14. That is, the breaking strength estimation and the detection of open/short circuit events may be simultaneously operating together to provide data and alert the user to any degradation of the elevator hoisting members 14. Further, the methods 600 and 700 may continuous and iteratively run.

It should now be understood that the embodiments described herein are directed to improved systems and methods to monitor and identify when an elevator hoisting member degradation based on estimating a current breaking strength using supervised learning algorithms and by determining open and/or short circuit events. Such monitoring is remotely achievable and alerts are provided to the elevator controllers to inhibit movement of the elevator hoisting members and to electronic computing device when certain predetermined parameters are below threshold value for breaking strength.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for monitoring operating conditions of an elevator hoisting member having one or more pairs of tensile load bearing conductive members, the system comprising:

an elevator controller;

a processing device communicatively coupled to the elevator controller; and a non-transitory, processor-readable storage medium in communication with the processing device, the non-transitory, processor-readable storage medium comprising one or more programming instructions that, when executed, cause the processing device to:

receive an actual resistance data from the one or more pairs of tensile load bearing conductive members;

calculate an adjusted resistance data by subtracting the actual resistance data from a baseline resistance data of the one or more pairs of tensile load bearing conductive members and dividing by the baseline resistance data;

input the adjusted resistance data into a process configured to model the adjusted resistance data into a breaking strength value for the elevator hoisting member;

receive the breaking strength value; and determine whether the breaking strength value is below a predetermined threshold value for a rated breaking load of the elevator hoisting member, wherein when the breaking strength value is below the predetermined threshold value, output an alert to the elevator controller to instruct the elevator controller to inhibit movement of the elevator hoisting member.

2. The system of claim 1, further comprising:

an electrical monitoring connector that is communicatively coupled to at least one of the one or more pairs of tensile load bearing conductive members.

3. The system of claim 2, wherein the non-transitory, processor-readable storage medium further comprising the one or more programming instructions that, when executed, cause the processing device to:

initiate a measurement command to gather a current sample of a continuous electrical signal that travels within the one of the one or more pairs of tensile load bearing conductive members of the elevator hoisting member.

4. The system of claim 1, wherein the process is a supervised learning algorithm having a predetermined number of trained trees at a predetermined depth.

5. The system of claim 4, wherein each trained tree of the predetermined number of trained trees returns a breaking strength data.

6. The system of claim 1, wherein the non-transitory, processor-readable storage medium further comprising the one or more programming instructions that, when executed, cause the processing device to:

formulate an estimated breaking strength value summation for the elevator hoisting member by averaging the breaking strength value for the elevator hoisting member over a predetermined number of measurements.

7. The system of claim 1, wherein the non-transitory, processor-readable storage medium further comprising the one or more programming instructions that, when executed, cause the processing device to:

output a warning of a deviation in the operating conditions of the elevator hoisting member to an electronic computing device that is remote from the processing device.

8. The system of claim 1, wherein the non-transitory, processor-readable storage medium further comprising the one or more programming instructions that, when executed, cause the processing device to determine whether an open/short circuit event occurred based on the received current resistance data from the one of the one or more pairs of tensile load bearing conductive members.

9. The system of claim 8, wherein the non-transitory, processor-readable storage medium further comprising the one or more programming instructions that, when executed, cause the processing device to increase an open/short circuit event counter when the open/short circuit event has occurred.

10. A method for monitoring operating conditions of an elevator hoisting member having one or more pairs of tensile load bearing conductive members, each one of the one or more pairs of tensile load bearing conductive members receiving and transmitting electrical signals indicative of the operating conditions of the elevator hoisting member, the method comprising:

- initiating, by a condition monitoring controller that is communicatively coupled to the one of the one or more pairs of tensile load bearing conductive members, a measurement command to gather a current sample of a continuous electrical signal that travels within the one of the one or more pairs of tensile load bearing conductive members of the elevator hoisting member;
- receiving, by the condition monitoring controller, an actual resistance data from the one of the one or more pairs of tensile load bearing conductive members;
- calculating, by the condition monitoring controller, an adjusted resistance data by subtracting the actual resistance data from a baseline resistance data of the one or more pairs of tensile load bearing conductive members and dividing by the baseline resistance data;
- inputting, by the condition monitoring controller, the adjusted resistance data into a process configured to model the adjusted resistance data into a breaking strength value for the elevator hoisting member;
- receiving, by the condition monitoring controller, the breaking strength value for the elevator hoisting member and determining whether the breaking strength value for the elevator hoisting member is below a predetermined threshold value for a rated breaking load for the elevator hoisting member; and
- outputting, by the condition monitoring controller, an alert to an elevator controller to instruct the elevator controller to inhibit movement of the elevator hoisting member when the breaking strength value for the elevator hoisting member is below the predetermined threshold value.

11. The method of claim 10, wherein the process is a supervised learning algorithm.

12. The method of claim 10, further comprising:

- formulating, by the condition monitoring controller, an estimated breaking strength value summation for the elevator hoisting member by averaging the breaking strength value for the elevator hoisting member over a predetermined number of measurements.

13. The method of claim 10, further comprising:

- outputting, by the condition monitoring controller, a warning of a deviation in the operating conditions of the elevator hoisting member to an electronic computing device that is remote from the condition monitoring controller.

14. The method of claim 10, further comprising:

- determining, by the condition monitoring controller whether an open/short circuit event has occurred based on the received current resistance data from the one of the one or more pairs of tensile load bearing conductive members; and
- increasing, by the condition monitoring controller, an open/short circuit event counter when the open/short circuit event has occurred.

15. A system for monitoring operating conditions of an elevator hoisting member having one or more pairs of tensile load bearing conductive members of an elevator assembly, the elevator assembly further including an elevator controller, an elevator cab and at least one sheave, the elevator hoisting member having a sleeve enclosing the one or more pairs of tensile load bearing conductive members, the elevator hoisting member extending around the at least one sheave to support the elevator cab, the system comprising:

- a processing device communicatively coupled to the elevator controller; and
- a storage medium in communication with the processing device and having one or more programming instructions that, when executed, cause the processing device to:
  - initiate a measurement command to gather an actual resistance data of the one or more pairs of tensile load bearing conductive members;
  - receive the actual resistance data from the one of the one or more pairs of tensile load bearing conductive members;
  - calculate an adjusted resistance data by subtracting the actual resistance data from a baseline resistance data of the one or more pairs of tensile load bearing conductive members and dividing by the baseline resistance data;
  - input the adjusted resistance data into a process configured to model the adjusted resistance data into a breaking strength value for the elevator hoisting member;
  - receive the breaking strength value for the elevator hoisting member;
  - retrieve a predetermined number of historical breaking strength values for the elevator hoisting member;
  - formulate an estimated breaking strength value summation for the elevator hoisting member by averaging the breaking strength value for the elevator hoisting member with the predetermined number of historical breaking strength values for the elevator hoisting member; and
  - determine whether the estimated breaking strength value summation for the elevator hoisting member is below a predetermined threshold value for a rated breaking load of the elevator hoisting member;
  - wherein when the estimated breaking strength value summation for the elevator hoisting member is below the predetermined threshold value, output an alert to the elevator controller to inhibit movement of the elevator hoisting member.

16. The system of claim 15, wherein an electrical monitoring connector is communicatively coupled to at least one of the one or more pairs of tensile load bearing conductive members and to the processing device.

17. The system of claim 15, wherein the process is a supervised learning algorithm.

18. The system of claim 15, wherein the processing device is further configured to determine whether an open/short circuit event occurred based on the received current resistance data from the one of the one or more pairs of tensile load bearing conductive members.

19. The system of claim 18, wherein the processing device is further configured to increase an open/short circuit event counter when the open/short circuit event has occurred.

20. The system of claim 15, wherein the processing device is further configured to:

- output a warning of a deviation in the operating conditions of the elevator hoisting member to an electronic computing device.

* * * * *